US012742069B2

(12) United States Patent
Maizuru et al.

(10) Patent No.: US 12,742,069 B2
(45) Date of Patent: Sep. 22, 2026

(54) RESIN COMPOSITION

(71) Applicant: KANEKA CORPORATION, Osaka (JP)

(72) Inventors: Nobuyoshi Maizuru, Hyogo (JP); Toshihiko Okamoto, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 592 days.

(21) Appl. No.: 18/340,252

(22) Filed: Jun. 23, 2023

(65) Prior Publication Data

US 2023/0331982 A1 Oct. 19, 2023

Related U.S. Application Data

(63) Continuation of application No. PCT/JP2021/047832, filed on Dec. 23, 2021.

(30) Foreign Application Priority Data

Dec. 25, 2020 (JP) ................................ 2020-217565
Mar. 3, 2021 (JP) ................................ 2021-033814

(51) Int. Cl.
*C08L 63/00* (2006.01)
*C08F 279/02* (2006.01)

(52) U.S. Cl.
CPC ............ *C08L 63/00* (2013.01); *C08F 279/02* (2013.01)

(58) Field of Classification Search
None
See application file for complete search history.

(56) References Cited

U.S. PATENT DOCUMENTS

2007/0219319 A1 9/2007 Saegusa
2016/0251510 A1 9/2016 Furukawa et al.
2018/0362694 A1 12/2018 Miyatake
2019/0040290 A1* 2/2019 Okamoto ................ B32B 27/06
2020/0017622 A1 1/2020 Fruth et al.

FOREIGN PATENT DOCUMENTS

CN 1950413 A 4/2007
JP H08183836 A 7/1996
JP 2008291153 A 12/2008
JP 2015-078280 A 4/2015
JP 2015182248 A 10/2015
JP 2018177826 A 11/2018
JP 2020512426 A 4/2020
JP 2020-164601 A 10/2020
WO 2015053289 A1 4/2015
WO 2016/159223 A1 10/2016
WO 2017145953 A1 8/2017
WO 2019123934 A1 6/2019
WO 2020196919 A1 10/2020

OTHER PUBLICATIONS

International Search Report issued in counterpart International Application No. PCT/JP2021/047832, issued Mar. 8, 2022 (4 pages).
International Preliminary Report on Patentability and Written Opinion issued in counterpart International Application No. PCT/JP2021/047832, dated Mar. 8, 2022 (7 pages).
Office Action issued in corresponding Chinese Patent Application No. 202180086063.1, dated Sep. 13, 2024, with translation (17 pages).
Office Action issued in counterpart Chinese Patent Application No. 202180086063.1 mailed Oct. 14, 2025 (8 pages).
Office Action issued in Chinese Application No. 202180086063.1; Dated Feb. 27, 2025 (18 pages).
"Study on the Rheological Properties of the Self-crosslinking Acrylate Composite Polymer Emulsion", Huoming He et al., Polymer Materials and Engineering, vol. 01, pp. 92-96 (5 pages).

* cited by examiner

*Primary Examiner* — Robert T Butcher
(74) *Attorney, Agent, or Firm* — Osha Bergman Watanabe & Burton LLP

(57) ABSTRACT

A resin composition contains polymer particles (A) and a matrix resin (B) such that the polymer particles (A) have a graft part having a glass transition temperature of −25 °C to 18 °C. The resin composition has excellent handleability.

20 Claims, No Drawings

RESIN COMPOSITION

TECHNICAL FIELD

One or more embodiments of the present invention relate to a resin composition.

BACKGROUND

Thermosetting resins have various kinds of excellent properties such as high heat resistance and high mechanical strength, and therefore are used in various fields. Out of the thermosetting resins, epoxy resins are used for a wide variety of purposes, as matrix resins for, for example, sealants for electronic circuits, paints, adhesive agents, and fiber-reinforced materials. The epoxy resins have excellent heat resistance, chemical resistance, insulating properties, and the like, but are insufficient in impact resistance which is a characteristic of thermosetting resins. One widely used method to improve the impact resistance of a thermosetting resin is to add an elastomer to the thermosetting resin.

Examples of the elastomer encompass polymer particles (for example, crosslinked polymer particles). It is easy to simply mix the polymer particles and the thermosetting resin (for example, epoxy resin). The polymer particles and the thermosetting resin are mixed, for example, in the following manner. Several polymer particles each of which has a particle size of less than 1 μm are collected to prepare a powdery and/or granular material of the polymer particles which has a particle size of not less than 1 μm. Thereafter, the powdery and/or granular material and the thermosetting resin are mechanically mixed. Note that a powdery and/or granular material of polymer particles, which is prepared by collecting several polymer particles in this manner, is referred to as secondary particles. Note also that polymer particles themselves, each of which has a particle size of less than 1 μm before being processed into a powdery and/or granular material, are referred to as primary particles. By the above mixing method, it is possible to disperse secondary particles of the polymer particles in the thermosetting resin. However, it is extremely difficult, at an industrial level, to disperse, in the thermosetting resin, primary particles of the polymer particles, each of which has a particle size of less than 1 μm.

Patent Literature 1 discloses an epoxy resin composition that contains a core-shell polymer in which a shell layer contains a structural unit containing an alkoxy group or an aryloxy group.

Various other particles are also developed as polymer particles having a core-shell structure (for example, Patent Literatures 2 through 7).

PATENT LITERATURE

Patent Literature 1

PCT International Publication No. WO2015/053289

Patent Literature 2

Japanese Patent Application Publication, *Tokukai*, No. 2015-182248

Patent Literature 3

Japanese Patent Application Publication, *Tokukai*, No. H8-183836 (1996)

Patent Literature 4

Japanese Patent Application Publication, *Tokukai*, No. 2008-291153

Patent Literature 5

Published Japanese Translation of PCT International Application, *Tokuhyo*, No. 2020-512426

Patent Literature 6

PCT International Publication No. WO2017-145953

Patent Literature 7

Japanese Patent Application Publication, *Tokukai*, No. 2018-177826

However, the conventional technique as described above has room for further improvements from the viewpoint of handleability.

SUMMARY

An aspect of one or more embodiments of the present invention has been made in view of the above, and an aspect of one or more embodiments of the present invention provides a resin composition having excellent handleability.

As a result of conducting diligent research in order to attain the above, the inventors of one or more embodiments of the present invention accomplished one or more embodiments of the present invention.

That is, a resin composition in accordance with one or more embodiments of the present invention contains polymer particles (A) and a matrix resin (B), the polymer particles (A) having a graft part, the graft part being a polymer that (i) (i-a) contains no structural unit containing an aromatic group or (i-b) contains, in 100% by weight of the graft part, more than 0% by weight but not more than 10% by weight of a structural unit containing an aromatic group, (ii) contains at least one selected from the group consisting of a structural unit derived from alkyl methacrylate and a structural unit derived from alkyl acrylate, and (iii) contains no structural unit containing an alkoxy group, no structural unit containing an aryloxy group, no structural unit containing an oxetane group, no structural unit containing a hydroxy group, no structural unit containing an amino group, no structural unit containing an imide group, no structural unit containing a carboxylic acid group, no structural unit containing a carboxylic anhydride group, no structural unit containing a cyclic ester group, no structural unit containing a cyclic amide group, no structural unit containing a benzoxazine group, and no structural unit containing a cyanate ester group, and the graft part having a glass transition temperature of −25° C. to 18° C.

A resin composition in accordance with one or more embodiments of the present invention contains polymer particles (A) and a matrix resin (B), the polymer particles (A) having a graft part, the graft part being a polymer that, in 100% by weight of the graft part, (i) (i-a) contains no structural unit containing an aromatic group or (i-b) contains more than 0% by weight but not more than 10% by weight of a structural unit containing an aromatic group, and (ii) (ii-a) contains at least one selected from the group consisting of a structural unit derived from alkyl methacrylate and a structural unit derived from alkyl acrylate (ii-b) in a total amount of not less than 50% by weight, the graft part having a glass transition temperature of −25° C. to 18° C., and the polymer particles (A) being contained in an amount of 20% by weight to 50% by weight and the matrix resin (B) being contained in an amount of 50% by weight to 80% by weight, where 100% by weight represents a total amount of the polymer particles (A) and the matrix resin (B).

An aspect of one or more embodiments of the present invention can provide a resin composition having excellent handleability.

DETAILED DESCRIPTION

The following description will discuss one or more embodiments of the present invention. One or more embodiments of the present invention are not, however, limited to these embodiments. One or more embodiments of the present invention are not limited to the configurations described below, but may be altered in various ways within the scope of the claims. One or more embodiments of the present invention also encompass, in their technical scope, any embodiments or Example derived by combining technical means disclosed in differing embodiments and Examples. Further, it is possible to form a new technical feature by combining the technical means disclosed in the respective embodiments. All academic and patent documents cited in the present specification are incorporated herein by reference. Any numerical range expressed as “A to B” in the present specification means “not less than A and not more than B (i.e., the range from A to B which includes both A and B)” unless otherwise stated.

1. Technical Idea of One or More Embodiments of the Present Invention

As described above, there is a technique for adding polymer particles to a thermosetting resin for improving the impact resistance of the thermosetting resin. In some cases, there is a demand for a resin composition in which polymer particles are contained in a matrix resin at a high concentration. Examples of such a case encompass a case in which a resin composition containing polymer particles at a high concentration is mixed with another matrix resin so as to obtain a resin composition containing the polymer particles at a low concentration. In this case, the resin composition containing the polymer particles at a high concentration is used as a so-called “masterbatch”. In some cases, for the purpose of improving the effect of polymer particles to modify a matrix resin, there is a demand for a resin composition in which polymer particles are contained at a high concentration in a matrix resin.

However, in a case where a polymer particle concentration in a resin composition is high, the viscosity of the resin composition increases so that the handleability of the resin composition is impaired. One or more embodiments of the present invention provide a resin composition that has excellent handleability, that is, has low viscosity, even when the resin composition contains polymer particles at a high concentration.

As a result of conducting diligent research in order to attain the above, the inventors of one or more embodiments of the present invention made a novel finding that the use of polymer particles which have a graft part having a low glass transition temperature makes it possible to attain the above. On the basis of this finding, the inventors of one or more embodiments of the present invention accomplished one or more embodiments of the present invention.

In some cases, an inorganic filler, in addition to polymer particles, is further blended with a resin composition. In such a case, functional groups contained in the polymer particles react with the inorganic filler to cause the viscosity of the resin composition to increase, so that the handleability of the resin composition may be impaired.

One or more embodiments of the present invention provide a resin composition that has excellent handleability, that is, has low viscosity, even when the resin composition contains polymer particles and an inorganic filler.

As a result of conducting diligent research, the inventors of one or more embodiments of the present invention made a novel finding that the use of polymer particles that have a graft part containing no functional groups which may interact with an inorganic filler makes it possible to attain the above.

2. Resin Composition

A resin composition in accordance with one or more embodiments of the present invention contains polymer particles (A) and a matrix resin (B). The polymer particles (A) have a graft part.

The graft part (I) is a polymer that (i) (i-a) contains no structural unit containing an aromatic group or (i-b) contains, in 100% by weight of the graft part, more than 0% by weight but not more than 10% by weight of a structural unit containing an aromatic group, (ii) contains at least one selected from the group consisting of a structural unit derived from alkyl methacrylate and a structural unit derived from alkyl acrylate, and (iii) contains no structural unit containing an alkoxy group, no structural unit containing an aryloxy group, no structural unit containing an oxetane group, no structural unit containing a hydroxy group, no structural unit containing an amino group, no structural unit containing an imide group, no structural unit containing a carboxylic acid group, no structural unit containing a carboxylic anhydride group, no structural unit containing a cyclic ester group, no structural unit containing a cyclic amide group, no structural unit containing a benzoxazine group, and no structural unit containing a cyanate ester group, or (II) is a polymer that, in 100% by weight of the graft part, (i) (i-a) contains no structural unit containing an aromatic group or (i-b) contains more than 0% by weight but not more than 10% by weight of a structural unit containing an aromatic group, and (ii) (ii-a) contains at least one selected from the group consisting of a structural unit derived from alkyl methacrylate and a structural unit derived from alkyl acrylate (ii-b) in a total amount of not less than 50% by weight.

The graft part has a glass transition temperature of −25° C. to 18° C. The polymer particles (A) may be contained in an amount of 20% by weight to 50% by weight, and the matrix resin (B) may be contained in an amount of 50% by weight to 80% by weight, where 100% by weight represents the total amount of the polymer particles (A) and the matrix resin (B).

In the present disclosure, a "resin composition in accordance with one or more embodiments of the present invention" may be hereinafter merely referred to as a "present resin composition".

Because the present resin composition is arranged as described above, the present resin composition has an advantage of having excellent handleability. In the present specification, a "resin composition having excellent handleability" is intended to mean that the resin composition has low viscosity, for example, a viscosity of not more than 20,900 mPa·s at 50° C. That is, because the present resin composition is arranged as described above, the present resin composition has an advantage of having low viscosity (for example, the resin composition has a viscosity of not more than 20,900 mPa·s at 50° C.).

Because the present resin composition is arranged as described above, the resin composition has an advantage of having excellent handleability even in a case where the resin composition further contains an inorganic filler. That is, because the present resin composition is arranged as described above, the resin composition has an advantage of having low viscosity even in a case where the resin composition further contains an inorganic filler (for example, the resin composition containing the inorganic filler has a viscosity of not more than 280,000 mPa·s at 25° C.).

(2-1. Polymer Particles (A))

Polymer particles (A) are fine particles obtained by polymerization. Polymer particles (A) have a graft part. Provided that the polymer particles (A) have a graft part, the other structures are not particularly limited. The polymer particles (A) can also be referred to as a graft copolymer.

(Graft Part)

In the present specification, a polymer grafted to any polymer is referred to as a graft part.

The graft part may be a polymer that contains no structural unit containing an alkoxy group, no structural unit containing an aryloxy group, no structural unit containing an oxetane group, no structural unit containing a hydroxy group, no structural unit containing an amino group, no structural unit containing an imide group, no structural unit containing a carboxylic acid group, no structural unit containing a carboxylic anhydride group, no structural unit containing a cyclic ester group, no structural unit containing a cyclic amide group, no structural unit containing a benzoxazine group, and no structural unit containing a cyanate ester group. The above structural units may interact with an inorganic filler. Therefore, because the graft part contains none of the above structural units, the resulting resin composition has an advantage of having excellent handleability even in a case where the resin composition further contains an inorganic filler.

The graft part is a polymer that (a) contains no structural unit containing an aromatic group or (b) contains more than 0% by weight but not more than 10% by weight of a structural unit containing an aromatic group in 100% by weight of the graft part. With this feature, the resin composition has an advantage of having excellent handleability (that is, having low viscosity). The graft part may contain no structural unit containing an aromatic group (i.e., contains 0% by weight of a structural unit containing an aromatic group in 100% by weight of the graft part) because, with such a graft part, the resulting resin composition has excellent handleability.

The graft part contains at least one selected from the group consisting of a structural unit derived from alkyl methacrylate and a structural unit derived from alkyl acrylate. This feature brings about an advantage of being able to cause the glass transition temperature (Tg) of the graft part to be low. The graft part is a polymer that (a) contains at least one selected from the group consisting of a structural unit derived from alkyl methacrylate and a structural unit derived from alkyl acrylate (b) in a total amount of, in 100% by weight of the graft part, preferably not less than 50% by weight, more preferably not less than 55% by weight, more preferably not less than 60% by weight, more preferably not less than 65% by weight, more preferably not less than 70% by weight, more preferably not less than 75% by weight, more preferably not less than 78% by weight, more preferably not less than 80% by weight, and particularly preferably not less than 83% by weight, because (a) such a graft part is unlikely to interact with an inorganic filler and (b) such a graft part has a lower glass transition temperature (Tg) so that it is easier to obtain a graft part having a Tg falling within a desired range. There are no particular limitations on the upper limit of the total amount of the structural unit derived from alkyl methacrylate and the structural unit derived from alkyl acrylate in 100% by weight of the graft part. For example, the upper limit can be 100% by weight. In addition, in one or more embodiments of the present invention, the graft part is a polymer that contains, in 100% by weight of the graft part, at least one selected from the group consisting of a structural unit derived from alkyl methacrylate and a structural unit derived from alkyl acrylate in an amount of preferably not less than 50% by weight, more preferably not less than 55% by weight, more preferably not less than 60% by weight, more preferably not less than 65% by weight, more preferably not less than 70% by weight, more preferably not less than 75% by weight, more preferably not less than 78% by weight, more preferably not less than 80% by weight, and particularly preferably not less than 83% by weight, because (a) such a graft part is unlikely to interact with an inorganic filler and (b) such a graft part has a lower glass transition temperature (Tg) so that it is easier to obtain a graft part having a Tg falling within a desired range. There are no particular limitations on the upper limit of at least one selected from the group consisting of the amount of the structural unit derived from alkyl methacrylate and the amount of the structural unit derived from alkyl acrylate in 100% by weight of the graft part. For example, the upper limit can be 100% by weight.

In the present specification, alkyl (meth)acrylate is intended to mean at least one selected from the group consisting of alkyl methacrylate and alkyl acrylate. The alkyl group of alkyl (meth)acrylate from which the structural unit of the graft part is derived may have 1 to 4 carbon atoms because this makes it easy to lower the glass transition temperature of the graft part. The graft part may be a copolymer of monomer components that contain alkyl (meth)acrylate which has an alkyl group having 1 to 4 carbon atoms. From the viewpoint of workability of the resin composition, the monomer component contains alkyl (meth)acrylate which has an alkyl group having 1 to 4 carbon atoms in an amount of preferably not less than 55% by weight, more preferably not less than 65% by weight, more preferably not less than 75% by weight, more preferably not less than 78% by weight, and particularly preferably not less than 83% by weight. In addition, the monomer component contains alkyl (meth)acrylate which has an alkyl group having 1 to 4 carbon atoms in an amount of preferably not more than 95% by weight and more preferably not more than 90% by weight because this makes it possible to allow the polymer particles (A) to be dispersed in the form of primary particles in a resin composition or a cured product thereof. It should be noted that "workability" of a resin composition is intended to mean "handleability" of the resin composition. Therefore, the expression, "from the viewpoint of workability of the resin composition", is intended to mean "because a resulting resin composition has excellent handleability".

In other words, the graft part may contain a structural unit derived from alkyl (meth)acrylate which has an alkyl group having 1 to 4 carbon atoms. From the viewpoint of workability of the resin composition, the graft part contains, in 100% by weight of the graft part, a structural unit derived from alkyl (meth)acrylate which has an alkyl group having 1 to 4 carbon atoms in an amount of preferably not less than 55% by weight, more preferably not less than 65% by weight, more preferably not less than 75% by weight, even more preferably not less than 78% by weight, and particularly preferably not less than 83% by weight. In addition, the graft part contains, in 100% by weight of the graft part, a structural unit derived from alkyl (meth)acrylate which has an alkyl group having 1 to 4 carbon atoms in an amount of preferably not more than 95% by weight and more preferably not more than 90% by weight because this makes it possible to allow the polymer particles (A) to be dispersed in the form of primary particles in a resin composition or a cured product thereof.

The monomer component may contain alkyl (meth)acrylate which has an alkyl group having 1 carbon atom. From the viewpoint of workability of the resin composition, the monomer component contains alkyl (meth)acrylate which has an alkyl group having 1 carbon atom in an amount of preferably 10% by weight to 100% by weight, more preferably 11% by weight to 95% by weight, more preferably 12% by weight to 92% by weight, even more preferably 13% by weight to 55% by weight, and particularly preferably 14% by weight to 50% by weight. The monomer component preferably contains alkyl (meth)acrylate which has an alkyl group having 2 carbon atoms. From the viewpoint of workability of the resin composition, the monomer component contains alkyl (meth)acrylate which has an alkyl group having 2 carbon atoms in an amount of preferably 10% by weight to 100% by weight and more preferably 11% by weight to 95% by weight. The monomer component preferably contains alkyl (meth)acrylate which has an alkyl group having 3 carbon atoms. From the viewpoint of workability of the resin composition, the monomer component contains alkyl (meth)acrylate which has an alkyl group having 3 carbon atoms in an amount of preferably 10% by weight to 100% by weight and more preferably 11% by weight to 95% by weight. The monomer component preferably contains alkyl (meth)acrylate which has an alkyl group having 4 carbon atoms. From the viewpoint of workability of the resin composition, the monomer component contains alkyl (meth)acrylate which has an alkyl group having 4 carbon atoms in an amount of preferably 0% by weight to 80% by weight, more preferably 1% by weight to 78% by weight, more preferably 2% by weight to 76% by weight, even more preferably 20% by weight to 74% by weight, and particularly preferably 35% by weight to 72% by weight.

In other words, the graft part may contain a structural unit derived from alkyl (meth)acrylate which has an alkyl group having 1 carbon atom. The graft part contains, in 100% by weight of the graft part, a structural unit derived from alkyl (meth)acrylate which has an alkyl group having 1 carbon atom in an amount of preferably 10% by weight to 100% by weight, more preferably 11% by weight to 95% by weight, more preferably 12% by weight to 92% by weight, even more preferably 13% by weight to 55% by weight, and particularly preferably 14% by weight to 50% by weight, because the resulting resin composition has excellent handleability. In addition, the graft part may contain a structural unit derived from alkyl (meth)acrylate which has an alkyl group having 2 carbon atoms. The graft part contains, in 100% by weight of the graft part, a structural unit derived from alkyl (meth)acrylate which has an alkyl group having 2 carbon atoms in an amount of preferably 10% by weight to 100% by weight and more preferably 11% by weight to 95% by weight, because the resulting resin composition has excellent handleability. In addition, the graft part may contain a structural unit derived from alkyl (meth)acrylate which has an alkyl group having 3 carbon atoms. The graft part contains, in 100% by weight of the graft part, a structural unit derived from alkyl (meth)acrylate which has an alkyl group having 3 carbon atoms in an amount of preferably 10% by weight to 100% by weight and more preferably 11% by weight to 95% by weight, because the resulting resin composition has excellent handleability. In addition, the graft part preferably contains a structural unit derived from alkyl (meth)acrylate which has an alkyl group having 4 carbon atoms. The graft part contains, in 100% by weight of the graft part, a structural unit derived from alkyl (meth)acrylate which has an alkyl group having 4 carbon atoms in an amount of preferably 0% by weight to 80% by weight, more preferably 1% by weight to 78% by weight, more preferably 2% by weight to 76% by weight, even more preferably 20% by weight to 74% by weight, and particularly preferably 35% by weight to 72% by weight, because the resulting resin composition has excellent handleability.

The graft part has the above feature, and therefore can play various roles. The "various roles" are, for example, (a) improving compatibility between the polymer particles (A) and the matrix resin (B), (b) improving the dispersibility of the polymer particles (A) in the matrix resin (B) with which the polymer particles (A) are mixed, and (c) allowing the polymer particles (A) to be dispersed in the form of primary particles in the resin composition or in a cured product obtained from the resin composition.

In the present specification, "alkyl methacrylate" is intended to mean alkyl methacrylate which has no reactive functional group (e.g., an alkoxy group, a hydroxy group, and the like). Specific examples of the alkyl methacrylate encompass methyl methacrylate (MMA), ethyl methacrylate (EMA), butyl methacrylate (BMA), and 2-ethylhexyl methacrylate (EHMA).

In the present disclosure, "alkyl acrylate" is intended to mean alkyl acrylate which has no reactive functional group (e.g., an alkoxy group, a hydroxy group, and the like). Specific examples of the alkyl acrylate encompass methyl acrylate (MA), ethyl acrylate (EA), n-butyl acrylate (BA), and 2-ethylhexyl acrylate (EHA).

The graft part may be a polymer which contains only one selected from the group consisting of a structural unit derived from alkyl methacrylate and a structural unit derived from alkyl acrylate, or may be a polymer which contains both of the structural units.

The graft part may contain, as a structural unit, a structural unit having an epoxy group. With the above feature, it is possible to chemically bond (i) the graft part contained in the polymer particles (A) and (ii) the matrix resin (B) in the resin composition. Thus, in the resin composition or in a cured product obtained from the resin composition, it is possible to maintain a favorable state of dispersion of the polymer particles (A) without causing the polymer particles (A) to agglutinate.

In order to obtain a graft part that contains a structural unit having an epoxy group, it is possible to use, in the production (polymerization) of the graft part, a monomer having an epoxy group. Specific examples of the monomer having an epoxy group encompass glycidyl-group-containing vinyl monomers such as glycidyl (meth) acrylates, 4-hydroxybutyl (meth)acrylate glycidyl ethers, and allyl glycidyl ethers. In the present specification, (meth)acrylate is intended to mean acrylate and/or methacrylate.

These monomers having epoxy group(s) may be used alone or in combination of two or more.

The graft part may contain a structural unit having an epoxy group in an amount of more than 0% by weight and not more than 50% by weight, 1% by weight to 40% by weight, 3% by weight to 30% by weight, 3% by weight to 20% by weight, or 3% by weight to 16% by weight, with respect to 100% by weight of the graft part. (a) In a case where the graft part contains the structural unit derived from the monomer(s) having the epoxy group(s) in an amount of more than 0% by weight with respect to 100% by weight of the graft part, the resin composition to be obtained can provide a cured product which has sufficient impact resistance. (b) In a case where the graft part contains the structural unit derived from the epoxy group-containing monomer in an amount of not more than 50% by weight with respect to 100% by weight of the graft part, the resin composition to be obtained has advantages that (i) the resin composition can provide a cured product which has sufficient impact resistance and (ii) the resin composition has favorable storage stability.

An epoxy group may react (interact) with an inorganic filler (such as silica). Therefore, from the viewpoint of handleability of the resin composition further containing an inorganic filler, the graft part may contain a small amount of structural unit having an epoxy group.

The structural unit derived from a monomer having an epoxy group may be contained in the graft part, or may be contained only in the graft part.

The graft part may contain, as a structural unit, a structural unit derived from a polyfunctional monomer. In a case where the graft part contains the structural unit derived from the polyfunctional monomer, there are the following advantages, for example: (a) it is possible to prevent swelling of the polymer particles (A) in the resin composition; (b) since the resin composition has a low viscosity, the resin composition tends to have favorable handleability; and (c) the dispersibility of the polymer particles (A) in the matrix resin (B) is improved.

In a case where the graft part does not contain the structural unit derived from the polyfunctional monomer, the resin composition to be obtained can provide a cured product which has more excellent toughness and impact resistance, as compared to a case where the graft part contains the structural unit derived from the polyfunctional monomer.

It can also be said that the polyfunctional monomer is a monomer having two or more radical-polymerizable reactive groups in an identical molecule. The radical-polymerizable reactive groups each may be a carbon-carbon double bond. Examples of the polyfunctional monomer exclude butadiene and include (meth)acrylates having an ethylenically unsaturated double bond(s), such as allyl alkyl (meth) acrylates and allyl oxyalkyl (meth)acrylates. Examples of a monomer having two (meth)acrylic groups encompass ethylene glycol di(meth)acrylate, butylene glycol di(meth)acrylate, butanediol di(meth)acrylate, hexanediol di(meth)acrylate, cyclohexane dimethanol di(meth)acrylate, and polyethylene glycol di(meth)acrylates. Examples of the polyethylene glycol di(meth)acrylates encompass triethylene glycol di(meth)acrylate, tripropylene glycol di(meth) acrylate, tetraethylene glycol di(meth)acrylate, and polyethylene glycol (600) di(meth)acrylate. Examples of a monomer having three (meth)acrylic groups encompass alkoxylated trimethylolpropane tri(meth)acrylates, glycerol propoxy tri(meth)acrylate, pentaerythritol tri(meth)acrylate, and tris(2-hydroxyethyl)isocyanurate tri(meth)acrylate. Examples of the alkoxylated trimethylolpropane tri(meth) acrylates encompass trimethylolpropane tri(meth)acrylate and trimethylolpropane triethoxy tri(meth)acrylate. Examples of a monomer having four (meth)acrylic groups encompass pentaerythritol tetra(meth)acrylate and ditrimethylolpropane tetra(meth)acrylate. Examples of a monomer having five (meth)acrylic groups encompass dipentaerythritol penta(meth)acrylate. Examples of a monomer having six (meth)acrylic groups encompass ditrimethylolpropane hexa(meth)acrylate. Examples of the polyfunctional monomer also encompass diallyl phthalate, triallyl cyanurate, triallyl isocyanurate, and divinylbenzene.

Among the above polyfunctional monomers, examples of a polyfunctional monomer which may be used for the polymerization of the graft part encompass allyl methacrylate, diallyl phthalate, triallyl isocyanurate, and divinylbenzene. Such polyfunctional monomers may be used alone or in combination of two or more.

The graft part may contain structural unit(s) derived from polyfunctional monomer(s) in an amount of 1% by weight to 20% by weight, or 5% by weight to 15% by weight, with respect to 100% by weight of the graft part.

In formation of the graft part by polymerization, the foregoing monomers may be used alone or in combination of two or more. The graft part may contain a structural unit derived from another monomer, in addition to the structural units derived from the above-listed monomers.

The graft part may be a polymer grafted to an elastic body (described later).

(Glass Transition Temperature of Graft Part)

From the viewpoint of preventing the polymer particles (A) in the resin composition from being fused to each other, the glass transition temperature (which may hereinafter be referred to merely as "Tg") of the graft part may be not lower than −25° C., not lower than −23° C., not lower than −21° C., not lower than −19° C., not lower than −17° C., not lower than −15° C., or not lower than −13° C.

The Tg of the graft part may be not higher than 18° C., not higher than 16° C., not higher than 14° C., not higher than 12° C., not higher than 10° C., not higher than 8° C., not higher than 6° C., not higher than 4° C., not higher than 2° C., not higher than 0° C., not higher than −2° C., not higher than −4° C., not higher than −5° C., not higher than −7° C., not higher than −9° C., or not higher than −11° C., because this makes it possible to obtain a resin composition having low viscosity (that is, a resin composition having excellent handleability).

The Tg of the graft part can be determined by, for example, the composition of the structural unit contained in the graft part. In other words, it is possible to adjust the Tg of the resulting graft part by changing the composition of the monomer used to produce (form by polymerization) the graft part.

In a case where the graft part is a copolymer of two or more types of monomers and the monomers used in the production (polymerization) of the graft part are known, the glass transition temperature Tg of the graft part can be calculated by the following FOX formula (Mathematical Formula 1):

$$1/Tg=w_1/Tg_1+w_2/Tg_2+\ldots+w_n/Tg_n \quad \text{(Mathematical Formula 1)}$$

where $Tg_1$, $Tg_2$, . . . , $Tg_n$ are each a Tg(K) of a homopolymer of the components 1, 2, . . . , n that constitute the graft part (i.e., monomers used in the production of the graft part), and $w_1$, $w_2$, . . . , $w_n$ are each a weight fraction of the components 1, 2, . . . , n that constitute the graft part (i.e., monomers used in the production of the graft part). In addition, the Tg of the homopolymer can be expressed with use of, for example, the numerical values provided in Polymer Handbook Fourth Edition (edited by J. Brandup et al.; John Wiley 86 Sons, Inc.). In a case of a novel polymer, a peak temperature of a loss tangent (tan δ) in a viscoelasticity measurement method (shearing method, measurement frequency: 1 Hz) can be employed as a Tg.

In a case where the monomer used in the production (polymerization) of the graft part is unknown, the Tg of the graft part can be also obtained by carrying out viscoelasticity measurement using a planar plate made of polymer particles (A). Specifically, the Tg can be measured as follows: (1) a graph of tan δ is obtained by carrying out dynamic viscoelasticity measurement with respect to a planar plate made of the polymer particles (A), with use of a dynamic viscoelasticity measurement device (for example, DVA-200, manufactured by IT Keisoku Seigyo Kabushikigaisha) under a tension condition; and (2) in the graph of tan δ thus obtained, the peak temperature of tan δ is regarded as the glass transition temperature. Note, here, that in a case where a plurality of peaks are found in the graph of tan δ, the highest peak temperature is regarded as the glass transition temperature of the graft part.

Note, here, that monomers which provide a homopolymer having a Tg of not more than 0° C. will be referred to as monomers "a". Examples of monomers "a" encompass ethyl acrylate, butyl acrylate, 2-ethylhexyl acrylate, octyl (meth) acrylate, and dodecyl (meth)acrylate. These monomers "a" may be used alone or in combination of two or more. Out of these monomers "a", ethyl acrylate, butyl acrylate, and 2-ethylhexyl acrylate are particularly preferable.

In 100% by weight of the graft part, the graft part may contain a structural unit derived from monomers "a" in an amount of not less than 20% by weight, not less than 30% by weight, or not less than 40% by weight. In addition, in 100% by weight of the graft part, the graft part contains a structural unit derived from monomers having a glass transition temperature of not higher than 0° C. in an amount of preferably not more than 95% by weight, more preferably not more than 90% by weight, and even more preferably not more than 80% by weight. In a case where the graft part contains a structural unit derived from the monomers "a" in an amount of not less than 20% by weight in 100% by weight of the graft part, it is possible to obtain a resin composition having lower viscosity.

(Graft Rate of Graft Part)

In one or more embodiments of the present invention, the polymer particles (A) may have a polymer which is identical in composition to the graft part and which is not grafted to a polymer (e.g., elastic body described later). In the present specification, a "polymer that is identical in composition to the graft part but is not grafted to a polymer" may be referred to as "non-grafted polymer". The non-grafted polymer constitutes a part of the polymer particles (A) in accordance with one or more embodiments of the present invention. It can also be said that the non-grafted polymer is a polymer that is not grafted to a polymer, out of polymers produced during formation of the graft part by polymerization (preparation step).

In the present specification, the proportion of (i) a polymer which is grafted to a polymer to (ii) the polymers produced during the formation of the graft part by polymerization, i.e., the proportion of the graft part, is referred to as a "graft rate". In other words, the graft rate is a value represented by the following expression: (weight of graft part)/{(weight of graft part)+(weight of non-grafted polymer)}×100.

Furthermore, during the step of preparing the graft part, a soluble part is also present in addition to the graft part and the non-grafted polymer. The soluble part is intended to mean monomers not polymerized and auxiliary materials such as an initiator.

The polymer particles (A), a non-grafted polymer, and a soluble part can be distinguished by, for example, a method for determining the solubility/insolubility in a solvent. Examples of such a method encompass a method in which (i) the polymer particles (A) are identified if insoluble in MEK, (ii) a non-grafted polymer is identified if soluble in MEK but insoluble in methanol, and (iii) a soluble part is identified if soluble in both MEK and methanol.

The graft rate of the graft part may be not less than 70%, not less than 80%, or not less than 90%. In a case where the graft rate is not less than 70%, there is an advantage that the viscosity of the resin composition does not become too high.

In the present specification, the graft rate is calculated by the following method. First, an aqueous suspension containing the polymer particles (A) is obtained. Next, a powdery and/or granular material of the polymer particles (A) is obtained from the aqueous suspension. A specific example of a method of obtaining the powdery and/or granular material of the polymer particles (A) from the aqueous suspension is a method of obtaining the powdery and/or granular material of the polymer particles (A) by (i) causing the polymer particles (A) in the aqueous suspension to coagulate, (ii) dehydrating the coagulate thus obtained, and (iii) further drying the coagulate. Next, 2 g of the powdery and/or granular material of the polymer particles (A) is dissolved in 50 mL of methyl ethyl ketone (hereinafter also referred to as "MEK"). The MEK solution of the powder thus obtained is separated into a part soluble in MEK (MEK-soluble part) and a part insoluble in MEK (MEK-insoluble part). Specifically, the following (1) through (3) are carried out: (1) The obtained MEK solution of the powder is subjected to centrifugal separation with use of a centrifugal separator (CP60E, manufactured by Hitachi Koki Co., Ltd.) at rotation speed of 30000 rpm for 1 hour, and thereby separated into the MEK-soluble part and the MEK-insoluble part. (2) The obtained MEK-soluble part and MEK are mixed. The resultant MEK mixture is subjected to centrifugal separation with use of the foregoing centrifugal separator at rotation speed 30000 rpm for 1 hour, and the MEK mixture is separated into the MEK-soluble part and the MEK-insoluble part. (3) The above operation (2) is repeated once (that is, the centrifugal separation is carried out three times total). The above operation produces a concentrated MEK-soluble part. Next, 20 ml of the concentrated MEK-soluble part is mixed with 200 ml of methanol. An aqueous calcium chloride solution in which 0.01 g of calcium chloride is dissolved in water is added to the obtained mixture, and the mixture thus obtained is stirred for 1 hour. After that, the obtained mixture is separated into a methanol-soluble part and a methanol-insoluble part. The weight of the methanol-insoluble part is used as the weight of the non-grafted polymer.

The graft rate is calculated with use of the following formula. Graft rate (%)=100−[weight of methanol-insoluble part/{(weight of methanol-insoluble part)+(weight of MEK-insoluble part)}/(weight of polymer of graft part)×10000

Note that the weight of a polymer other than the graft part is the amount of monomer introduced for formation of the polymer other than the graft part. The polymer other than the graft part is, for example, the elastic body. In a case where the polymer particles (A) contain a surface-crosslinked polymer (described later), the polymer other than the graft part includes both the elastic body and the surface-crosslinked polymer. The weight of the polymer of the graft part is the total weight of the monomer components (monomer mixture for forming the graft part) used in the preparation of the polymer of the graft part. In calculation of the graft rate, a method of causing the polymer particles (A) to coagulate is not limited to any particular one, and a method in which a solvent is used, a method in which a coagulant is used, a method in which the aqueous suspension is sprayed, or the like can be employed.

(Variations of Graft Part)

In one or more embodiments of the present invention, the graft part may be constituted by only one type of graft part which has a structural unit having identical composition. In one or more embodiments of the present invention, the graft part may be constituted by a plurality of types of graft parts which have structural units different from each other in composition.

A case where the graft part is constituted by a plurality of types of graft parts in one or more embodiments of the present invention will be described. In this case, the plurality of types of graft parts will be referred to as a graft part$_1$, a graft part$_2$, . . . a graft part$_n$ ("n" is an integer of 2 or more). The graft part may include a complex of the graft part$_1$, the graft part$_2$ . . . , and the graft part$_n$ which are individually formed by polymerization. The graft part may include a polymer obtained by forming the graft part$_1$, the graft part$_2$, . . . , and the graft part$_n$ in order by polymerization. Forming a plurality of polymerized parts (graft parts) by polymerization in order in this manner is also referred to as multistage polymerization. A polymer obtained by multistage polymerization of a plurality of types of graft parts is also referred to as a multistage-polymerization graft part. A method of producing a multistage-polymerization graft part will be later described in detail.

In a case where the graft part is constituted by the plurality of types of graft parts, all of the plurality of types of graft parts do not need to be grafted to the elastic body. It is only necessary that at least part of at least one of the plurality of types of graft parts is grafted to the elastic body. The other types of graft parts (the other types of the plurality of types of graft parts) may be grafted to the at least part of the at least one of the plurality of types of graft parts which is grafted to the elastic body. In a case where the graft part is constituted by the plurality of types of graft parts, the graft part may have a plurality of types of polymers which are identical in composition to the plurality of types of graft parts and which are not grafted to the elastic body (a plurality of types of non-grafted polymers).

The multistage-polymerization graft part constituted by the graft part$_1$, the graft part$_2$, . . . the graft part$_n$ will be described. In the multistage-polymerization graft part, the graft part$_n$ can cover at least part of a graft part$_{n-1}$ or the whole of the graft part$_{n-1}$. In the multistage-polymerization graft part, part of the graft part$_n$ may be located inside the graft part$_{n-1}$.

In the multistage-polymerization graft part, the graft parts may form a layer structure. For example, in a case where the multistage-polymerization graft part is constituted by the graft part$_1$, the graft part$_2$, and a graft part$_3$, aspects of one or more embodiments of the present invention also include an aspect in which the graft part$_1$ forms the innermost layer of the graft part, a layer of the graft part$_2$ is formed on the outer side of the graft part$_1$, and a layer of the graft part$_3$ is formed on the outer side of the layer of the graft part$_2$ as the outermost layer. Thus, it can also be said that the multistage-polymerization graft part in which the graft parts form a layer structure is a multilayered graft part. In other words, in one or more embodiments of the present invention, the graft part may include (a) a complex of plurality of types of graft parts, (b) a multistage-polymerization graft part, and/or (c) a multilayered graft part.

In a case where a polymer (e.g., elastic body described later) and the graft part are formed in this order by polymerization in production of the polymer particles (A), at least part of the graft part can cover at least part of the polymer in the resulting polymer particles (A). The wording "a polymer and a graft part are formed in this order by polymerization" can be reworded as follows: a polymer and the graft part are subjected to multistage polymerization. It can also be said that the polymer particles (A) obtained by multistage polymerization of the polymer and a graft part are a multistage polymer.

In a case where the polymer particles (A) are constituted by a multistage polymer, the graft part can cover at least part or the whole of the polymer (e.g., elastic body described later). In a case where the polymer particles (A) are constituted by a multistage polymer, part of the graft part may be located inside the polymer. At least part of the graft part may cover at least part of the elastic body. In other words, at least part of the graft part may be present on the outermost side of the polymer particles (A).

In a case where the polymer particles (A) are constituted by a multistage polymer, a polymer (e.g., elastic body described later) and the graft part may form a layer structure. For example, aspects of one or more embodiments of the present invention also include an aspect in which the elastic body forms the innermost layer (also referred to as a core layer) and a layer of the graft part is formed on the outer side of the elastic body as the outermost layer (also referred to as a shell layer). It can also be said that a structure in which the elastic body is present as a core layer and the graft part is present as a shell layer is a core-shell structure. It can also be said that the polymer particles (A) that contain the elastic body and the graft part which form a layer structure (core-shell structure) are constituted by a multilayered polymer or a core-shell polymer. In other words, in one or more embodiments of the present invention, the polymer particles (A) may be constituted by a multistage polymer and/or a multilayered polymer or a core-shell polymer. Note, however, that the polymer particles (A) are not limited to the above feature, provided that the fine polymer particles (A) have the graft part.

(Elastic Body)

The polymer particles (A) may further have the elastic body. The foregoing graft part may be a polymer grafted to an elastic body. That is, the polymer particles (A) may be constituted by a rubber-containing graft copolymer which has the elastic body and the graft part grafted to the elastic body. The following description will discuss one or more embodiments of the present invention while taking as an example a case where the polymer particles (A) are constituted by a rubber-containing graft copolymer.

The elastic body may contain at least one selected from the group consisting of diene-based rubbers, (meth)acrylate-based rubbers, and organosiloxane-based rubbers. The elastic body may contain natural rubber other than the above described rubber. The elastic body can also be referred to as elastic part(s) or rubber particle(s).

A case where the elastic body includes a diene-based rubber (case (1)) will be described. In the case (1), the resin composition to be obtained can provide a cured product which has excellent toughness and impact resistance. It can be said that a cured product that has excellent toughness and/or excellent impact resistance is a cured product that has excellent durability.

The diene-based rubber is an elastic body containing, as a structural unit, a structural unit derived from a diene-based monomer. The diene-based monomer can also be referred to as a conjugated diene-based monomer. In the case (1), the diene-based rubber may contain (i) the structural unit derived from the diene-based monomer in an amount of 50% by weight to 100% by weight and (ii) a structural unit derived from a vinyl-based monomer, which is different from the diene-based monomer and which is copolymerizable with the diene-based monomer, in an amount of 0% by weight to 50% by weight, with respect to 100% by weight of structural units. In the case (1), the diene-based rubber may contain, as a structural unit, a structural unit derived from a (meth)acrylate-based monomer in an amount smaller than the amount of the structural unit derived from the diene-based monomer.

Examples of the diene-based monomer encompass 1,3-butadiene, isoprene (2-methyl-1,3-butadiene), and 2-chloro-1,3-butadiene. These diene-based monomers may be used alone or in combination of two or more.

Examples of the vinyl-based monomer which is different from the diene-based monomer and which is copolymerizable with the diene-based monomer (hereinafter also referred to as vinyl-based monomer A) encompass: vinyl arenes such as styrene, α-methylstyrene, monochlorostyrene, and dichlorostyrene; vinyl carboxylic acids such as acrylic acid and methacrylic acid; vinyl cyanides such as acrylonitrile and methacrylonitrile; vinyl halides such as vinyl chloride, vinyl bromide, and chloroprene; vinyl acetate; alkenes such as ethylene, propylene, butylene, and isobutylene; and polyfunctional monomers such as diallyl phthalate, triallyl cyanurate, triallyl isocyanurate, and divinylbenzene. These vinyl-based monomers A may be used alone or in combination of two or more. Out of these vinyl-based monomers A, styrene is particularly preferable. Note that, in the diene-based rubber in the case (1), the structural unit derived from the vinyl-based monomer A is an optional component. Note that, in the case (1), the diene-based rubber may be constituted by only the structural unit derived from the diene-based monomer.

In the case (1), the diene-based rubber may be (i) butadiene rubber which is constituted by a structural unit derived from 1,3-butadiene (also referred to as polybutadiene rubber) or (ii) butadiene-styrene rubber which is a copolymer of 1,3-butadiene and styrene (also referred to as polystyrene-butadiene). The diene-based rubber may be butadiene rubber. According to the above feature, since the polymer particles (A) contain the diene-based rubber, a desired effect can be more brought about. The butadiene-styrene rubber is more preferable in that the butadiene-styrene rubber makes it possible to, by adjustment of a refractive index, increase the transparency of a cured product to be obtained.

A case where the elastic body includes a (meth)acrylate-based rubber (case (2)) will be described. The case (2) allows wide-ranging polymer design for the elastic body by combinations of many types of monomers.

The (meth)acrylate-based rubber is an elastic body containing, as a structural unit, a structural unit derived from a (meth)acrylate-based monomer. In the case (2), the (meth) acrylate-based rubber may contain (i) the structural unit derived from the (meth)acrylate-based monomer in an amount of 50% by weight to 100% by weight and (ii) a structural unit derived from a vinyl-based monomer, which is different from the (meth)acrylate-based monomer and which is copolymerizable with the (meth)acrylate-based monomer, in an amount of 0% by weight to 50% by weight, with respect to 100% by weight of structural units. In the case (2), the (meth)acrylate-based rubber may contain, as a structural unit, a structural unit derived from a diene-based monomer in an amount smaller than the amount of the structural unit derived from the (meth)acrylate-based monomer.

Examples of the (meth)acrylate-based monomer encompass: alkyl (meth)acrylates such as methyl (meth)acrylate, ethyl (meth)acrylate, butyl (meth)acrylate, 2-ethylhexyl (meth)acrylate, octyl (meth)acrylate, dodecyl (meth)acrylate, stearyl (meth)acrylate, and behenyl (meth)acrylate; aromatic ring-containing (meth) acrylates such as phenoxyethyl (meth)acrylate and benzyl (meth) acrylate; hydroxyalkyl (meth)acrylates such as 2-hydroxyethyl (meth)acrylate and 4-hydroxybutyl (meth)acrylate; glycidyl (meth)acrylates such as glycidyl (meth)acrylate and glycidyl alkyl (meth) acrylate; alkoxy alkyl (meth) acrylates; allyl alkyl (meth)acrylates such as allyl (meth)acrylate and allyl alkyl (meth)acrylates; and polyfunctional (meth)acrylates such as monoethylene glycol di(meth)acrylate, triethylene glycol di(meth)acrylate, and tetraethylene glycol di(meth)acrylate. These (meth)acrylate-based monomers may be used alone or in combination of two or more. Out of these (meth)acrylate-based monomers, ethyl (meth)acrylate, butyl (meth)acrylate, and 2-ethylhexyl (meth)acrylate are preferred, and butyl (meth)acrylate is more preferred.

In the case (2), the (meth)acrylate-based rubber may be at least one selected from the group consisting of ethyl (meth) acrylate rubbers, butyl (meth)acrylate rubbers, and 2-ethylhexyl (meth)acrylate rubbers, or a butyl (meth)acrylate rubber. An ethyl (meth)acrylate rubber is a rubber composed of structural units derived from ethyl (meth)acrylate(s), a butyl (meth)acrylate rubber is a rubber composed of structural units derived from butyl (meth)acrylate(s), and a 2-ethylhexyl (meth)acrylate rubber is a rubber composed of structural units derived from 2-ethylhexyl (meth)acrylate(s). According to the configuration, the glass transition temperature (Tg) of the elastic body is low, and therefore polymer particles (A) and a resin composition having low Tg are obtained. As a result, (a) a resultant resin composition can provide a cured product having excellent toughness, and (b) it is possible to cause the resin composition to have a lower viscosity.

Examples of the vinyl-based monomer which is different from the (meth)acrylate-based monomer and which is copolymerizable with the (meth)acrylate-based monomer (hereinafter also referred to as vinyl-based monomer B) encompass the monomers listed as the examples of the vinyl-based monomer A. Such vinyl-based monomers B may be used alone or in combination of two or more. Out of such vinyl-based monomers B, styrene is particularly preferable.

Note that, in the (meth)acrylate-based rubber in the case (2), the structural unit derived from the vinyl-based monomer B is an optional component. Note that, in the case (2), the (meth)acrylate-based rubber may be constituted by only the structural unit derived from the (meth)acrylate-based monomer.

A case where the elastic body includes an organosiloxane-based rubber (case (3)) will be described. In the case (3), the resin composition to be obtained can provide a cured product which has sufficient heat resistance and which has excellent impact resistance at low temperatures.

Examples of the organosiloxane-based rubber encompass (a) organosiloxane-based polymers composed of alkyl or aryl disubstituted silyloxy units, such as dimethylsilyloxy, diethylsilyloxy, methylphenylsilyloxy, diphenylsilyloxy, and dimethylsilyloxy-diphenylsilyloxy, and (b) organosiloxane-based polymers composed of alkyl or aryl monosubstituted silyloxy units, such as organohydrogensilyloxy in which some of sidechain alkyls have been substituted with hydrogen atoms. These organosiloxane-based polymers may be used alone or in combination of two or more.

In the present specification, a polymer composed of dimethylsilyloxy unit is referred to as a dimethylsilyloxy rubber, a polymer composed of methylphenylsilyloxy unit is referred to as a methylphenylsilyloxy rubber, and a polymer composed of dimethylsilyloxy unit and diphenylsilyloxy unit is referred to as a dimethylsilyloxy-diphenylsilyloxy rubber. In the case (3), the organosiloxane-based rubber may be (a) at least one selected from the group consisting of dimethylsilyloxy rubbers, methylphenylsilyloxy rubbers and dimethylsilyloxy-diphenylsilyloxy rubbers, because a resin composition which contains the resulting powdery and/or granular material can provide a cured product or molded product which has excellent heat resistance, or (b) a dimethylsilyloxy rubber because it can be easily obtained and is economical.

In the case (3), it is preferable that the polymer particles (A) contain an organosiloxane-based rubber in an amount of not less than 80% by weight, more preferably not less than 90% by weight, with respect to 100% by weight of the elastic body contained in the polymer particles (A). According to the above feature, the resin composition to be obtained can provide a cured product which has excellent heat resistance.

The elastic body may further include an elastic body other than the diene-based rubber, the (meth)acrylate-based rubber, and the organosiloxane-based rubber. Examples of the elastic body other than the diene-based rubber, the (meth) acrylate-based rubber, and the organosiloxane-based rubber encompass natural rubber.

In one or more embodiments of the present invention, the elastic body may be at least one selected from the group consisting of butadiene rubbers, butadiene-styrene rubbers, butadiene-(meth)acrylate rubbers, ethyl (meth)acrylate rubbers, butyl (meth)acrylate rubbers, 2-ethylhexyl (meth)acrylate rubbers, dimethylsilyloxy rubbers, methylphenylsilyloxy rubbers, and dimethylsilyloxy-diphenylsilyloxy rubbers, at least one selected from the group consisting of butadiene rubbers, butadiene-styrene rubbers, butyl (meth) acrylate rubbers, and dimethylsilyloxy rubbers, at least one selected from the groups consisting of butadiene rubbers and butadiene-styrene rubbers, or butadiene rubbers. The above feature brings about the advantage of being able to decrease the viscosity of the resin composition to be obtained.

(Crosslinked Structure of Elastic Body)

The elastic body may have a crosslinked structure introduced therein, from the viewpoint of maintenance of stable dispersion of the polymer particles (A) in the matrix resin (B). A generally used method may be used to introduce a crosslinked structure into the elastic body. Examples of the generally used method encompass the following. That is, in production of the elastic body, a crosslinking monomer(s), such as a polyfunctional monomer and/or a mercapto group-containing compound, is/are mixed with a monomer which can constitute the elastic body, and then polymerization is carried out. In the present specification, producing a polymer such as the elastic body is also referred to as forming a polymer by polymerization.

A method of introducing a crosslinked structure into an organosiloxane-based rubber includes the following methods: (1) a method that involves using a polyfunctional alkoxysilane compound in combination with another material during formation of the organosiloxane-based rubber by polymerization; (2) a method that involves introducing, into the organosiloxane-based rubber, a reactive group (e.g., (i) mercapto group, (ii) vinyl group having reactivity, and the like), and then adding (a) an organic peroxide, (b) a polymerizable vinyl monomer, or the like to the obtained reaction product to cause a radical reaction; and (3) a method that involves, during formation of the organosiloxane-based rubber by polymerization, mixing a crosslinking monomer(s), such as a polyfunctional monomer and/or a mercapto group-containing compound, together with another material and then carrying out polymerization.

Examples of the polyfunctional monomer encompass the polyfunctional monomers listed as the examples in the section (Graft part).

Examples of the mercapto group-containing compound encompass alkyl group-substituted mercaptan, allyl group-substituted mercaptan, aryl group-substituted mercaptan, hydroxy group-substituted mercaptan, alkoxy group-substituted mercaptan, cyano group-substituted mercaptan, amino group-substituted mercaptan, silyl group-substituted mercaptan, acid radical-substituted mercaptan, halo group-substituted mercaptan, and acyl group-substituted mercaptan. The alkyl group-substituted mercaptan may be alkyl group-substituted mercaptan having 1 to 20 carbon atoms, or alkyl group-substituted mercaptan having 1 to carbon atoms. The aryl group-substituted mercaptan may be phenyl group-substituted mercaptan. The alkoxy group-substituted mercaptan may be alkoxy group-substituted mercaptan having 1 to 20 carbon atoms, or alkoxy group-substituted mercaptan having 1 to 10 carbon atoms. The acid radical-substituted mercaptan may be alkyl group-substituted mercaptan having a carboxyl group and 1 to 10 carbon atoms or aryl group-substituted mercaptan having a carboxyl group and 1 to 12 carbon atoms.

(Glass Transition Temperature of Elastic Body)

The elastic body may have a glass transition temperature of not higher than 80° C., not higher than 70° C., not higher than 60° C., not higher than 50° C., not higher than 40° C., not higher than 30° C., not higher than 20° C., not higher than 10° C., not higher than 0° C., not higher than −20° C., not higher than −40° C., not higher than −45° C., not higher than −50° C., not higher than −55° C., not higher than −60° C., not higher than −65° C., not higher than −70° C., not higher than −75° C., not higher than −80° C., not higher than −85° C., not higher than −90° C., not higher than −95° C., not higher than −100° C., not higher than −105° C., not higher than −110° C., not higher than −115° C., not higher than −120° C., or not higher than −125° C. In the present specification, the “glass transition temperature” may be referred to as “Tg”. With this feature, it is possible to obtain polymer particles (A) having low Tg and a resin composition having low Tg. As a result, a resin composition can provide a cured product each of which has excellent toughness. According to the above feature, the resin composition can have a lower viscosity.

In a case where the elastic body is a copolymer of two or more types of monomers and the monomers used in the production (polymerization) of the elastic body are known, the glass transition temperature Tg of the elastic body can be calculated by, in the above FOX formula (Mathematical Formula 1), replacing $Tg_1, Tg_2, \ldots, Tg_n$ and $w_1, w_2, \ldots, w_n$ respectively with Tg of the component constituting the elastic body (i.e., the monomers used in the production of the graft part) and the weight ratio of the component constituting the elastic body (i.e., the monomers used in the production of the graft part).

In a case where the monomer used in the production (polymerization) of the elastic body is unknown, the Tg of the elastic body can be also obtained by carrying out viscoelasticity measurement using a planar plate made of polymer particles (A). Specifically, the Tg can be measured as follows: (1) a graph of tan δ is obtained by carrying out dynamic viscoelasticity measurement with respect to a planar plate made of the polymer particles (A), with use of a dynamic viscoelasticity measurement device (for example, DVA-200, manufactured by IT Keisoku Seigyo Kabushikigaisha) under a tension condition; and (2) in the graph of tan δ thus obtained, the peak temperature of tan δ is regarded as the glass transition temperature. Note, here, that in a case where a plurality of peaks are found in the graph of tan δ, the lowest peak temperature is regarded as the glass transition temperature of the elastic body.

In view of prevention of a decrease in elastic modulus (i.e., a decrease in rigidity) of the resulting cured product, i.e., in view of obtainment of the cured product which has a sufficient elastic modulus (rigidity), the Tg of the elastic body may be higher than 0° C., not lower than 20° C., not lower than 50° C., not lower than 80° C., or not lower than 120° C.

The Tg of the elastic body can be determined by, for example, the composition of the structural unit contained in the elastic body. In other words, it is possible to adjust the Tg of the resulting elastic body by changing the composition of the monomer used to produce (form by polymerization) the elastic body.

Note, here, that monomers which provide a homopolymer having a Tg of more than 0° C. will be referred to as monomers "b". Examples of the monomers "b" encompass, but are not limited to, unsubstituted vinyl aromatic compounds such as styrene and 2-vinyl naphthalene; vinyl-substituted aromatic compounds such as α-methyl styrene; ring-alkylated vinyl aromatic compounds such as 3-methylstyrene, 4-methylstyrene, 2,4-dimethylstyrene, 2,5-dimethylstyrene, 3,5-dimethylstyrene, and 2,4,6-trimethylstyrene; ring-alkoxylated vinyl aromatic compounds such as 4-methoxystyrene and 4-ethoxystyrene; ring-halogenated vinyl aromatic compounds such as 2-chlorostyrene and 3-chlorostyrene; ring-ester-substituted vinyl aromatic compounds such as 4-acetoxy styrene; ring-hydroxylated vinyl aromatic compounds such as 4-hydroxystyrene; vinyl esters such as vinyl benzoate and vinyl cyclohexanoate; vinyl halides such as vinyl chloride; aromatic monomers such as acenaphthalene and indene; alkyl methacrylates such as methyl methacrylate, ethyl methacrylate, and isopropyl methacrylate; aromatic methacrylates such as phenyl methacrylate; methacrylates such as isobornyl methacrylate and trimethylsilyl methacrylate; methacrylic acid derivative-containing methacryl monomers such as methacrylonitrile; certain types of acrylic acid esters such as isobornyl acrylate and tert-butyl acrylate; and acrylic acid derivative-containing acrylic monomers such as acrylonitrile. Examples of the monomers which can be included in the monomer group "a" further encompass monomers each of which, when polymerized, can provide a homopolymer having a Tg of not lower than 120° C., such as acrylamide, isopropyl acrylamide, N-vinylpyrrolidone, isobornyl methacrylate, dicyclopentanyl methacrylate, 2-methyl-2-adamanthyl methacrylate, 1-adamanthyl acrylate, and 1-adamanthyl methacrylate. These monomers "b" may be used alone or in combination of two or more. An elastic body containing (i) a structural unit(s) derived from at least one type of monomers selected from the group consisting of the above monomers "a" in an amount of 0% by weight to 50% by weight (more preferably 1% by weight to 35% by weight) and (ii) a structural unit(s) derived from at least one type of monomers selected from the group consisting of the monomers "b" in an amount of 50% by weight to 100% by weight (more preferably 65% by weight to 99% by weight) will be referred to as an elastic body G. The elastic body G has a Tg higher than 0° C. In a case where the elastic body includes the elastic body G, the resin composition to be obtained can provide a cured product which has sufficient rigidity.

Also in a case where the Tg of the elastic body is higher than 0° C., it is preferable that the crosslinked structure be introduced in the elastic body. Examples of a method of introducing the crosslinked structure into the elastic body encompass the above-described methods.

(Volume-Average Particle Size of Elastic Body)

The volume-average particle size of the elastic body, although not particularly limited, may be 0.03 μm to 50.00 μm, 0.05 μm to 10.00 μm, 0.08 μm to 2.00 μm, 0.10 μm to 1.00 μm, 0.10 μm to 0.80 μm, 0.10 μm to 0.50 μm, 0.15 μm to 0.30 μm, or not less than 0.15 μm but less than 0.30 μm, 0.16 μm to 0.28 μm, 0.17 μm to 0.27 μm, or 0.18 μm to 0.25 μm. (a) In a case where the volume-average particle size of the elastic body is not less than 0.03 μm, the elastic body which has a desired volume-average particle size can be stably obtained. (b) In a case where the volume-average particle size of the elastic body is not more than 50.00 μm, the resulting cured product or the resulting molded product has favorable heat resistance and impact resistance. (a) In a case where the volume-average particle size of the elastic body is not less than 0.15 μm, there is an advantage that the resin composition has decreased viscosity so as to have excellent handleability. (b) In a case where the volume-average particle size of the elastic body is not more than 0.30 μm, there is an advantage that a polymerization time of the elastic body becomes short, so that industrial productivity increases. The volume-average particle size of the elastic body can be measured with use of, for example, a dynamic light scattering type particle size distribution measurement apparatus using, as a test specimen, an aqueous suspension containing the elastic body. A method of measuring the volume-average particle size of the elastic body will be described later in detail in Examples.

(Proportion of Elastic Body)

A proportion of the elastic body contained in the polymer particles (A) may be 40% by weight to 97% by weight, 60% by weight to 95% by weight, or 70% by weight to 93% by weight, where 100% by weight represents the entirety of the polymer particles (A). (a) In a case where the proportion of the elastic body is not less than 40% by weight, the resulting resin composition can provide the cured product which has excellent toughness and impact resistance. (b) In a case where the proportion of the elastic body is not more than 97% by weight, the polymer particles (A) do not easily agglutinate and, therefore, the resin composition does not have a high viscosity, so that the resulting resin composition can be excellent in handling.

(Gel Content of Elastic Body)

The elastic body may be one that can swell in an appropriate solvent but is substantially insoluble in the appropriate solvent. The elastic body may be insoluble in a matrix resin (B) used.

The elastic body may have a gel content of not less than 60% by weight, not less than 80% by weight, not less than 90% by weight, or not less than 95% by weight. In a case where the gel content of the elastic body falls within the above range, the resin composition to be obtained can provide a cured product which has excellent toughness.

In the present specification, a method of calculating the gel content is as follows. First, an aqueous suspension containing the polymer particles (A) is obtained. Next, a powdery and/or granular material of the polymer particles (A) is obtained from the aqueous suspension. A method of obtaining the powdery and/or granular material of the polymer particles (A) from the aqueous suspension is not limited to any particular one, and examples thereof encompass a method of obtaining the powdery and/or granular material of the polymer particles (A) by (i) causing the polymer particles (A) in the aqueous suspension to agglutinate, (ii) dehydrating the agglutinate thus obtained, and (iii) further drying the agglutinate. Next, 2.0 g of the powdery and/or granular material of the polymer particles (A) is dissolved in 50 mL of methyl ethyl ketone (MEK). The MEK solution of the powder thus obtained is separated into a part soluble in MEK (MEK-soluble part) and a part insoluble in MEK (MEK-insoluble part). Specifically, the obtained MEK solution of the powder is subjected to centrifugal separation with use of a centrifugal separator (CP60E, manufactured by Hitachi Koki Co., Ltd.) at a rotation speed of 30000 rpm for 1 hour, and thereby separated into the MEK-soluble part and the MEK-insoluble part. Note, here, that three sets of centrifugal separations are carried out in total. The weight of the MEK-soluble part and the weight of the MEK-insoluble part are measured, and then the gel content is calculated with use of the following formula.

Gel content (%)=(weight of methyl ethyl ketone insoluble part)/{(weight of methyl ethyl ketone insoluble part)+(weight of methyl ethyl ketone soluble part)}×100

(Variations of Elastic Body)

In one or more embodiments of the present invention, the "elastic body" of the polymer particles (A) may be composed of only one type of elastic body which has an identical structural unit composition. In such a case, the "elastic body" of the polymer particles (A) may be one selected from the group consisting of diene-based rubbers, (meth)acrylate-based rubbers, and organosiloxane-based rubbers.

In one or more embodiments of the present invention, the "elastic body" of the polymer particles (A) may be composed of a plurality of types of elastic bodies which differ in structural unit composition from each other. In such a case, the "elastic body" of the polymer particles (A) may be two or more types selected from the group consisting of diene-based rubbers, (meth)acrylate-based rubbers, and organosiloxane-based rubbers. In such a case, the "elastic body" of the polymer particles (A) may be one selected from the group consisting of diene-based rubbers, (meth)acrylate-based rubbers, and organosiloxane-based rubbers. In other words, the "elastic body" of the polymer particles (A) may be a plurality of types, which differ in structural unit composition from each other, of the following rubbers: diene-based rubbers, (meth)acrylate-based rubbers, and/or organosiloxane-based rubbers.

In one or more embodiments of the present invention, a case where the "elastic body" of the polymer particles (A) is composed of a plurality of types of elastic bodies which differ in structural unit composition from each other will be described. In this case, the plurality of types of elastic bodies will be referred to as an elastic body$_1$, an elastic body$_2$, . . . and an elastic body$_n$, respectively. Note, here, that "n" is an integer of 2 or more. The "elastic body" of the polymer particles (A) may include a complex of the elastic body$_1$, the elastic body$_2$, . . . , and the elastic body$_n$ which have been individually formed by polymerization. The "elastic body" of the polymer particles (A) may include one elastic body obtained by forming the elastic body$_1$, the elastic body$_2$, . . . , and the elastic body$_n$ in order by polymerization. Forming a plurality of elastic bodies (polymers) by polymerization in order in this manner is also referred to as multistage polymerization. One elastic body obtained by multistage polymerization of a plurality of types of elastic bodies is also referred to as a multistage-polymerization elastic body. A method of producing a multistage-polymerization elastic body will be later described in detail.

A multistage-polymerization elastic body constituted by the elastic body$_1$, the elastic body$_2$, . . . and the elastic body$_n$ will be described. In the multistage-polymerization elastic body, the elastic body$_n$ can cover at least part of an elastic body$_{n-1}$ or the whole of the elastic body$_{n-1}$. In the multistage-polymerization elastic body, part of the elastic body$_n$ may be located inside the elastic body$_{n-1}$.

In the multistage-polymerization elastic body, the plurality of elastic bodies may form a layer structure. For example, in a case where the multistage-polymerization elastic body is constituted by the elastic body$_1$, the elastic body$_2$, and an elastic body$_3$, aspects of one or more embodiments of the present invention also include an aspect in which the elastic body$_1$ forms the innermost layer, a layer of the elastic body$_2$ is formed on the outer side of the elastic body$_1$, and a layer of the elastic body$_3$ is formed on the outer side of the layer of the elastic body$_2$ as the outermost layer of the elastic body. Thus, it can also be said that the multistage-polymerization elastic body in which the plurality of elastic bodies form a layer structure is a multilayered elastic body. In other words, in one or more embodiments of the present invention, the "elastic body" of the polymer particles (A) may include (a) a complex of a plurality of types of elastic bodies, (b) a multistage-polymerization elastic body, and/or (c) a multilayered elastic body.

The weight ratio of the elastic body to the graft part in the polymer particles (A) may be 65/35 to 92/8, 68/32 to 91/9, or 70/30 to 90/10, from the viewpoint of workability of the resin composition.

(Surface-crosslinked polymer)

The rubber-containing graft copolymer may further have a surface-crosslinked polymer in addition to the elastic body and the graft part grafted to the elastic body. In other words, the polymer particles (A) may further have a surface-crosslinked polymer in addition to the elastic body and the graft part grafted to the elastic body. One or more embodiments of the present invention will be described with reference to an example case in which the polymer particles (A) (e.g., rubber-containing graft copolymer) further has a surface-crosslinked polymer. In this case, (a) it is possible to make an improvement of an anti-blocking property in the production of the polymer particles (A) and (b) the dispersibility of the polymer particles (A) in the matrix resin (B) is made more favorable. Reasons for these are not limited to any particular ones, but can be inferred as follows. By the surface-crosslinked polymer covering at least part of the elastic body, the exposed area of the elastic body of the polymer particles (A) is reduced. Consequently, the elastic body is less likely to adhere to another elastic body, and therefore the dispersibility of the polymer particles (A) is improved.

In a case where the polymer particles (A) have the surface-crosslinked polymer, the following effects can be further brought about: (a) an effect of reducing the viscosity of the present resin composition; (b) an effect of increasing the crosslinking density of the elastic body; and (c) an effect of increasing the graft efficiency of the graft part. Note that the crosslinking density of the elastic body is intended to mean the degree of the number of crosslinked structures in the entirety of the elastic body.

The surface-crosslinked polymer is constituted by a polymer containing, as structural units, (i) a structural unit(s) derived from a polyfunctional monomer(s) in an amount of 30% by weight to 100% by weight and (ii) a structural unit(s) derived from vinyl-based monomer(s), other than the unit(s) derived from polyfunctional monomer(s), in an amount of 0% by weight to 70% by weight, which total 100% by weight.

Examples of the polyfunctional monomer which can be used to form the surface-crosslinked polymer by polymerization encompass polyfunctional monomers identical to the foregoing polyfunctional monomers. Out of such polyfunctional monomers, examples of a polyfunctional monomer which can be preferably used to form the surface-crosslinked polymer by polymerization encompass allyl methacrylate, ethylene glycol di(meth)acrylate, butylene glycol di(meth)acrylate (such as 1,3-butylene glycol dimethacrylate), butanediol di(meth)acrylate, hexanediol di(meth)acrylate, cyclohexane dimethanol di(meth)acrylate, and polyethylene glycol di(meth)acrylates. Such polyfunctional monomers may be used alone or in combination of two or more.

The polymer particles (A) may contain the surface-crosslinked polymer which is formed by polymerization independently of formation of the rubber-containing graft copolymer by polymerization, or may contain the surface-crosslinked polymer which is formed together with the rubber-containing graft copolymer by polymerization. The polymer particles (A) may be a multistage polymer obtained by forming the elastic body, the surface-crosslinked polymer, and the graft part in this order by multistage polymerization. In any of these aspects, the surface-crosslinked polymer can cover at least part of the elastic body.

The surface-crosslinked polymer can also be regarded as part of the elastic body. In other words, the surface-crosslinked polymer can also be regarded as part of the rubber-containing graft copolymer, and can be said to be a surface cross-linked polymerized part. In a case where the polymer particles (A) contain the surface-crosslinked polymer, the graft part may (a) be grafted to the elastic body other than the surface-crosslinked polymer, (b) be grafted to the surface-crosslinked polymer, or (c) be grafted to both the elastic body other than the surface-crosslinked polymer and the surface-crosslinked polymer. In a case where the polymer particles (A) contain the surface-crosslinked polymer, the above-described volume-average particle size of the elastic body means the volume-average particle size of the elastic body including the surface-crosslinked polymer.

A case will be described where the polymer particles (A) are a multistage polymer obtained by forming the elastic body, the surface-crosslinked polymer, and the graft part in this order by multistage polymerization (case (4)). In the case (4), the surface-crosslinked polymer can cover part of the elastic body or the whole of the elastic body. In the case (4), part of the surface-crosslinked polymer may be located inside the elastic body. In the case (4), the graft part can cover part of the surface-crosslinked polymer or the whole of the surface-crosslinked polymer. In the case (4), part of the graft part may be located inside the surface-crosslinked polymer. In the case (4), the elastic body, the surface-crosslinked polymer, and the graft part may form a layer structure. For example, aspects of one or more embodiments of the present invention also include an aspect in which the elastic body is present as the innermost layer (core layer), a layer of the surface-crosslinked polymer is present on the outer side of the elastic body as an intermediate layer, and a layer of the graft part is present on the outer side of the surface-crosslinked polymer as the outermost layer (shell layer).

(Volume-Average Particle Size (Mv) of Polymer Particles (A))

The volume-average particle size of the polymer particles (A), although not particularly limited, may be 0.03 μm to 50.00 μm, 0.05 μm to 10.00 μm, 0.08 μm to 2.00 μm, 0.10 μm to 1.00 μm, 0.10 μm to 0.80 μm, 0.10 μm to 0.50 μm, 0.15 μm to 0.30 μm, or not less than 0.15 μm but less than 0.30 μm, 0.16 μm to 0.28 μm, 0.17 μm to 0.27 μm, or 0.18 μm to 0.25 μm, from the viewpoint of industrial productivity and the workability of the resin composition, that is, because the volume-average particle size falling within these ranges will result in a resin composition having low viscosity. (a) In a case where the volume-average particle size of the polymer particles (A) is not less than 0.15 μm, there is an advantage that the resin composition has decreased viscosity so as to have excellent handleability. (b) In a case where the volume-average particle size of the polymer particles (A) is not more than 0.30 μm, there is an advantage that a polymerization time of the polymer particles (A) becomes short, so that industrial productivity increases. The volume-average particle size of the polymer particles is a volume-average particle size (Mv) of a latex containing polymer particles measured with use of Microtrac UPA150 (manufactured by Nikkiso Co., Ltd.).

In the resin composition, the polymer particles (A) may be dispersed in the form of primary particles. In the present disclosure, the phrase, "polymer particles (A) are dispersed in the form of primary particles", means that the polymer particles (A) are dispersed so as to be substantially independent from each other (no in contact). This state of dispersion can be confirmed by, for example, dissolving part of the resin composition in a solvent such as methyl ethyl ketone and measuring the particle size of the resultant product with use of, for example, a particle size measurer by laser beam scattering.

The value of the volume-average particle size (Mv)/number-average particle size (Mn) obtained via the above-described particle size measurement is not particularly limited but may be not more than 3.0, not more than 2.5, not more than 2.0, or not more than 1.5. Presumably, when the value of volume-average particle size (Mv)/number-average particle size (Mn) is not more than 3.0, the polymer particles (A) are dispersed favorably, and the physical properties, such as impact resistance and adhesiveness, of a cured product to be obtained become favorable.

The value of the volume-average particle size (Mv)/number-average particle size (Mn) can be determined by measuring the volume-average particle size (Mv) and the number-average particle size (Mn) with use of Microtrac UPA (manufactured by Nikkiso Co., Ltd.) and then dividing Mv by Mn.

The particle-number-based distribution of the volume-average particle size of the polymer particles (A) in the matrix resin (B) may have a full width at half maximum which is not less than 0.5 times and not more than 1 time the volume-average particle size, because the resin composition which has a low viscosity and is easy to handle is obtained.

(2-2. Method of Producing Polymer Particles (A))

The polymer particles (A) can be produced as follows: after a polymer is formed by polymerization, the polymer which constitutes the graft part is graft polymerized to the polymer in the presence of the polymer. The following description will discuss an example of a method of producing the polymer particles (A), while taking as an example a case where the elastic body is formed by polymerization and then the polymer which constitutes the graft part is graft polymerized to the elastic body in the presence of the elastic body to produce the polymer particles (A).

The polymer particles (A) can be produced by a known method, for example, a method such as an emulsion polymerization method, a suspension polymerization method, or a microsuspension polymerization method. Specifically, the formation of the elastic body by polymerization in the polymer particles (A), the formation of the graft part by polymerization in the polymer particles (A) (graft polymerization), and the formation of the surface-crosslinked polymer by polymerization in the polymer particles (A) can be each achieved by a known method, for example, a method such as an emulsion polymerization method, a suspension polymerization method, or a microsuspension polymerization method. Out of these methods, the emulsion polymerization method is particularly preferable as the method of producing the polymer particles (A). The emulsion polymerization method has the following advantages: it facilitates (a) compositional design of the polymer particles (A), (b) industrial production of the polymer particles (A), and (c) obtainment of a latex containing the polymer particles (A) which can be suitably used to produce the present resin composition. A method of producing the elastic body which can be contained in the polymer particles (A), a method of producing the graft part which can be contained in the polymer particles (A), and a method of producing the surface-crosslinked polymer which can be optionally contained in the polymer particles (A) will be described below.

(Method of Producing Elastic Body)

A case will be considered where the elastic body includes at least one type selected from the group consisting of diene-based rubbers and (meth)acrylate-based rubbers. In this case, the elastic body can be produced by, for example, a method such as emulsion polymerization, suspension polymerization, or microsuspension polymerization. As the method of producing the elastic body, a method disclosed in, for example, WO 2005/028546 can be used.

A case where the elastic body includes an organosiloxane-based rubber will be described. In this case, the elastic body can be produced by, for example, a method such as emulsion polymerization, suspension polymerization, or microsuspension polymerization. As the method of producing the elastic body, a method disclosed in, for example, WO 2006/070664 can be used.

A case where the "elastic body" of the polymer particles (A) is constituted by a plurality of types of elastic bodies (for example, an elastic body$_1$, an elastic body$_2$, . . . , an elastic body$_n$) will be described. In this case, a complex which is constituted by the plurality of types of elastic bodies may be produced in the following manner: the elastic body$_1$, the elastic body$_2$, . . . and the elastic body$_n$ are each polymerized individually by any of the above-described methods, and then these elastic bodies are mixed and complexed. Alternatively, the elastic body$_1$, the elastic body$_2$, . . . and the elastic body$_n$ may be formed in order by multistage polymerization to produce one elastic body which is constituted by the plurality of types of elastic bodies.

The multistage polymerization of the elastic bodies will be described in detail. For example, the multistage-polymerization elastic body can be obtained by carrying out in order the following steps (1) through (4): (1) The elastic body$_1$ is formed by polymerization; (2) next, the elastic body$_2$ is formed by polymerization in the presence of the elastic body$_1$ to obtain a two-stage elastic body$_{1+2}$; (3) subsequently, an elastic body$_3$ is formed by polymerization in the presence of the elastic body$_{1+2}$ to obtain a three-stage elastic body$_{1+2+3}$; and (4) after a similar process(es) is/are carried out, the elastic body$_n$ is formed by polymerization in the presence of an elastic body$_{1+2+ \ldots +(n-1)}$ to obtain a multistage-polymerization elastic body$_{1+2+ \ldots +n}$.

(Method of Producing Graft Part)

The graft part can be formed, for example, by polymerizing, by known radical polymerization, the monomer used to form the graft part. In a case where (a) the elastic body is obtained as an aqueous suspension or (b) a polymer particle precursor containing the elastic body and the surface-crosslinked polymer is obtained as an aqueous suspension, the graft part may be formed by emulsion polymerization. The graft part can be produced by a method disclosed in, for example, WO 2005/028546.

The method of producing the graft part in a case where the graft part is constituted by a plurality of types of graft parts (for example, a graft part$_1$, a graft part$_2$, . . . , a graft part$_n$) will be described. In this case, the graft part (complex) which is constituted by the plurality of types of graft parts may be produced in the following manner: the graft part$_1$, the graft part$_2$, . . . and the graft part$_n$ are each formed individually by any of the above-described methods, and then these graft parts are mixed and complexed. Alternatively, the graft part$_1$, the graft part$_2$, . . . the graft part$_n$ may be formed in order by multistage polymerization to produce one graft part which is constituted by the plurality of types of graft parts.

The multistage polymerization of the graft parts will be described in detail. For example, the multistage-polymerization graft part can be obtained by carrying out in order the following steps (1) through (4): (1) The graft part$_1$ is formed by polymerization; (2) next, the graft part$_2$ is formed by polymerization in the presence of the graft part$_1$ to obtain a two-stage graft part$_{1+2}$; (3) subsequently, a graft parts is formed by polymerization in the presence of the graft part$_{1+2}$ to obtain a three-stage graft part$_{1+2+3}$; and (4) after a similar process(es) is/are carried out, the graft part$_n$ is formed by polymerization in the presence of a graft part$_{1+2+ \ldots +(n-1)}$ to obtain a multistage-polymerization graft part$_{1+2+ \ldots +n}$.

In a case where the graft part is constituted by the plurality of types of graft parts, the polymer particles (A) may be produced as follows: the graft part which is constituted by the plurality of types of graft parts is formed by polymerization, and then these graft parts are graft polymerized to the elastic body. The polymer particles (A) may be produced as follows: in the presence of the elastic body, a plurality of types of polymers which constitute the graft part are formed in order by multistage graft polymerization with respect to the elastic body.

(Method of Producing Surface-Crosslinked Polymer)

The surface-crosslinked polymer can be formed by polymerizing, by known radical polymerization, the monomer used to form the surface-crosslinked polymer. In a case where the elastic body is obtained as an aqueous suspension, the surface-crosslinked polymer may be formed by emulsion polymerization.

In a case where emulsion polymerization is employed as the method of producing the polymer particles (A), a known emulsifying agent (dispersion agent) can be used in the production of the polymer particles (A).

Examples of the emulsifying agent include anionic emulsifying agents, nonionic emulsifying agents, polyvinyl alcohols, alkyl-substituted celluloses, polyvinylpyrrolidone, polyacrylic acid derivatives, and the like. Examples of the anionic emulsifying agent include sulfur-based emulsifying agents, phosphorus-based emulsifying agents, sarcosine acid-based emulsifying agents, carboxylic acid-based emulsifying agents, and the like. Examples of the sulfur-based emulsifying agent include sodium dodecylbenzenesulfonate (abbreviated as SDBS), and the like. Examples of the phosphorus-based emulsifying agent include sodium polyoxyethylene lauryl ether phosphate and the like.

In a case where emulsion polymerization is employed as the method of producing the polymer particles (A), a pyrolytic initiator can be used in the production of the polymer particles (A). It is possible to use, as the pyrolytic initiator, a known initiator such as (a) 2,2'-azobisisobutyronitrile, and (b) peroxides such as organic peroxides and inorganic peroxides, for example. Examples of the organic peroxide encompass t-butylperoxy isopropyl carbonate, paramenthane hydroperoxide, cumene hydroperoxide, dicumyl peroxide, t-butyl hydroperoxide, di-t-butyl peroxide, and t-hexyl peroxide. Examples of the inorganic peroxide encompass hydrogen peroxide, potassium persulfate, and ammonium persulfate.

In the production of the polymer particles (A), a redox initiator can also be used. The redox initiator is an initiator which contains a combination of (a) a peroxide such as an organic peroxide and an inorganic peroxide and (b) a transition metal salt (such as iron (II) sulfate) and/or a reducing agent such as sodium formaldehyde sulfoxylate or glucose. Further, as necessary, a chelating agent such as disodium ethylenediaminetetraacetate, and/or as necessary a phosphorus-containing compound such as sodium pyrophosphate may be used in combination.

Using the redox initiator makes it possible to (i) carry out polymerization even at a low temperature at which pyrolysis of the peroxide substantially does not occur and (ii) select a polymerization temperature from a wide range of temperatures. Thus, using the redox initiator is preferable. Out of redox initiators, redox initiators in which organic peroxides such as cumene hydroperoxide, dicumyl peroxide, paramenthane hydroperoxide, and t-butyl hydroperoxide are used as peroxides are preferable. The amount of the initiator used can be within a known range. In a case where the redox initiator is used, the amounts of, for example, the reducing agent used, the transition metal salt used, and the chelating agent used can be within known ranges.

In a case where, in the formation of the elastic body, the graft part, or the surface-crosslinked polymer by polymerization, a polyfunctional monomer is used to introduce a crosslinked structure into the elastic body, the graft part, or the surface-crosslinked polymer, a known chain transfer agent can be used in an amount within a known range. By using the chain transfer agent, it is possible to easily adjust the molecular weight and/or the degree of crosslinking of the resulting elastic body, the resulting graft part, or the resulting surface-crosslinked polymer.

In the production of the polymer particles (A), a surfactant can be further used, in addition to the above-described components. The type and the amount of the surfactant used are set within known ranges.

In the production of the polymer particles (A), conditions of polymerization such as polymerization temperature, pressure, and deoxygenation can be, as appropriate, conditions within known numerical ranges.

The latex can be obtained by the above method of producing the polymer particles (A). That is, the description in (2-2. Method of producing polymer particles (A)) can be applied as the description pertaining to the method of producing the latex.

(2-3. Matrix Resin (B))

As the matrix resin (B), a thermosetting resin can be suitably used. The thermosetting resin may include at least one type of thermosetting resin selected from the group consisting of: resins each containing a polymer obtained by polymerization of an ethylenically unsaturated monomer; epoxy resins; phenolic resins; polyol resins; and amino-formaldehyde resins (melamine resins). Examples of the thermosetting resin also encompass resins each containing a polymer obtained by polymerization of an aromatic polyester raw material. Examples of the aromatic polyester raw material encompass radical-polymerizable monomers (such as an aromatic vinyl compound, a (meth)acrylic acid derivative, a vinyl cyanide compound, and a maleimide compound), dimethyl terephthalate, and alkylene glycol. These thermosetting resins may be used alone or in combination of two or more.

(Ethylenically Unsaturated Monomer)

The ethylenically unsaturated monomer is not limited to any particular one, provided that the ethylenically unsaturated monomer has at least one ethylenically unsaturated bond in its molecule.

Examples of the ethylenically unsaturated monomer encompass acrylic acid, α-alkyl acrylic acids, α-alkyl acrylic acid esters, β-alkyl acrylic acids, β-alkyl acrylic acid esters, methacrylic acid, esters of acrylic acid, esters of methacrylic acid, vinyl acetate, vinyl esters, unsaturated esters, polyunsaturated carboxylic acids, polyunsaturated esters, maleic acid, maleic acid esters, maleic anhydride, and acetoxy styrene. These ethylenically unsaturated monomers may be used alone or in combinations of two or more.

(Epoxy Resins)

The epoxy resin is not particularly limited, provided that the epoxy resin contains at least one epoxy bond per molecule.

Specific examples of the epoxy resins encompass bisphenol A epoxy resin, bisphenol F epoxy resin, bisphenol AD epoxy resin, bisphenol S epoxy resin, glycidyl ester type epoxy resin, glycidyl amine type epoxy resin, novolac type epoxy resin, glycidyl ether epoxy resin of bisphenol A propylene oxide adduct, hydrogenated bisphenol A (or F) epoxy resin, fluorinated epoxy resin, rubber-modified epoxy resin containing polybutadiene or NBR, flame-resistant epoxy resin such as glycidyl ether of tetrabromo bisphenol A, p-oxybenzoic acid glycidyl ether ester type epoxy resin, m-aminophenol type epoxy resin, diaminodiphenylmethane-based epoxy resin, urethane-modified epoxy resin containing urethane bond, various types of alicyclic epoxy resin, glycidyl ether of a polyhydric alcohol, hydantoin-type epoxy resin, epoxidized unsaturated polymer such as petroleum resin, and amino-containing glycidyl ether resin. Examples of the polyhydric alcohol encompass N,N-diglycidyl aniline, N,N-diglycidyl-o-toluidine, triglycidyl isocyanurate, polyalkylene glycol diglycidyl ether, and glycerin. Other examples of the epoxy resins encompass an epoxy compound obtained by causing an addition reaction between one of the above epoxy resins and e.g., a bisphenol A (or F) or a polybasic acid. The epoxy resins are not limited to these examples, and a generally used epoxy resin can be used. These epoxy resins may be used alone or in combination of two or more.

Out of these epoxy resins, epoxy resins each of which has at least two epoxy groups in one molecule are preferable in that, e.g., such resins have high reactivity during curing of the resin composition and make it easy for an obtained cured product to create a three-dimensional mesh. In addition, out of the epoxy resins each of which has at least two epoxy groups in one molecule, epoxy resins each of which contains a bisphenol type epoxy resin as a main component are preferable, because they are economical and easily available.

(Phenolic Resins)

The phenolic resins are not limited to any particular ones, provided that the phenolic resins are each a compound obtained through a reaction between a phenol and an aldehyde. The phenol is not limited to any particular one, and examples thereof encompass phenols such as phenol, ortho-cresol, meta-cresol, para-cresol, xylenol, para-tertiary butylphenol, para-octylphenol, para-phenylphenol, bisphenol A, bisphenol F, and resorcin. In particular, phenol and cresol are preferred as the phenol.

The aldehyde is not limited to any particular one, and examples thereof encompass formaldehyde, acetaldehyde, butylaldehyde, and acrolein, and mixtures thereof. Alternatively, substances which are sources of the above aldehydes or solutions of the above aldehydes can be used. The aldehyde may be formaldehyde because an operation for reacting the phenol and the aldehyde is easy.

The molar ratio (F/P) between the phenol (P) and the aldehyde (F) in a reaction between the phenol and the aldehyde (such a molar ratio may be hereinafter referred to as a "reaction molar ratio") is not limited to any particular one. In a case where an acid catalyst is used in the reaction, the reaction molar ratio (F/P) may be 0.4 to 1.0, or 0.5 to 0.8. In a case where an alkali catalyst is used in the reaction, the reaction molar ratio (F/P) may be 0.4 to 4.0, or 0.8 to 2.5. In a case where the reaction molar ratio is equal to or higher than the above lower limit, a yield is less likely to excessively decrease and the resulting phenolic resin is less likely to have a low molecular weight. On the contrary, in a case where the reaction molar ratio is equal to or lower than the above upper limit, the phenolic resin is less likely to have an excessively high molecular weight and an excessively high softening point, and it is therefore possible to achieve sufficient flowability during heating. Furthermore, in a case where the reaction molar ratio is equal to or lower than the above upper limit, the molecular weight is easily controlled, and gelation may be less likely to occur or a partially gelatinized product may be less likely to be formed, each of which results from the conditions under which the reaction takes place.

(Polyol Resins)

The polyol resins are each a compound containing two or more active hydrogens as its terminal group(s), and are each bi- or more functional polyol with a molecular weight of about 50 to 20,000. Examples of the polyol resins encompass aliphatic alcohols, aromatic alcohols, polyether type polyols, polyester type polyols, polyolefin polyols, and acrylic polyols.

The aliphatic alcohols may be dihydric alcohols or trihydric or higher polyhydric alcohols (such as trihydric alcohols or tetrahydric alcohols). Examples of the dihydric alcohols encompass: alkylene glycols (in particular, alkylene glycols having about 1 to 6 carbon atoms) such as ethylene glycol, propylene glycol, 1,3-propanediol, 1,3-butanediol, 1,4-butanediol, 1,5-pentanediol, 1,6-hexanediol, 3-methyl-1,5-pentanediol, and neopentylglycol; and substances obtained through dehydrogenative condensation of two or more molecules (e.g., about two to six molecules) of any of the above alkylene glycols (such as diethylene glycol, dipropylene glycol, and tripropylene glycol). Examples of the trihydric alcohols encompass glycerin, trimethylolpropane, trimethylolethane, and 1,2,6-hexanetriol (in particular, trihydric alcohols having about 3 to 10 carbon atoms). Examples of the tetrahydric alcohols encompass pentaerythritol and diglycerin. Other examples encompass saccharides such as monosaccharides, oligosaccharides, and polysaccharides.

Examples of the aromatic alcohols encompass: bisphenols such as bisphenol A and bisphenol F; biphenyls such as dihydroxybiphenyl; polyhydric phenols such as hydroquinone and phenol-formaldehyde condensate; and naphthalenediol.

Examples of the polyether type polyols encompass: random copolymers and block copolymers obtained by ring-opening polymerization of ethylene oxide, propylene oxide, butylene oxide, styrene oxide, or the like in the presence of one or more active-hydrogen-containing initiators; and mixtures of these copolymers. Examples of the active-hydrogen-containing initiators used for the ring-opening polymerization to obtain the polyether type polyols encompass diols such as ethylene glycol, diethylene glycol, propylene glycol, dipropylene glycol, 1,3-butanediol, 1,4-butanediol, 1,6-hexanediol, neopentylglycol, and bisphenol A; triols such as trimethylolethane, trimethylolpropane, and glycerin; saccharides such as monosaccharides, oligosaccharides, and polysaccharides; sorbitol; and amines such as ammonia, ethylenediamine, urea, monomethyl diethanolamine, and monoethyl diethanolamine.

Examples of the polyester type polyols encompass polymers obtained by, in the presence of an esterification catalyst at a temperature falling within the range of 150° C. to 270° C., polycondensation of, for example, (a) a polybasic acid, such as maleic acid, fumaric acid, adipic acid, sebacic acid, phthalic acid, dodecanedioic acid, isophthalic acid, or azelaic acid, and/or an acid anhydride thereof and (b) a polyhydric alcohol such as ethylene glycol, propylene glycol, 1,4-butanediol, 1,6-hexanediol, diethylene glycol, dipropylene glycol, neopentylglycol, or 3-methyl-1,5-pentanediol. Examples of the polyester type polyols further encompass (a) polymers obtained by ring-opening polymerization of ε-caprolactone, valerolactone, or the like; and (b) active hydrogen compounds containing two or more active hydrogens, such as polycarbonate diol and castor oil.

Examples of the polyolefin type polyols encompass polybutadiene polyol, polyisoprene polyol, and hydrogenated versions thereof.

Examples of the acrylic polyols encompass: copolymers of, for example, (a) a hydroxyl group-containing monomer such as hydroxyethyl (meth)acrylate, hydroxybutyl (meth) acrylate, or vinylphenol and (b) a general-purpose monomer such as n-butyl (meth)acrylate or 2-ethylhexyl (meth)acrylate; and mixtures thereof.

Out of these polyol resins, the polyether type polyols are preferred, because the resin composition to be obtained has a lower viscosity and has excellent workability, and the resin composition can provide a cured product which is well balanced between its hardness and toughness. Further, out of these polyol resins, the polyester type polyols are preferred, because the resin composition to be obtained can provide a cured product which has excellent adhesiveness.

(Amino-Formaldehyde Resins)

The amino-formaldehyde resins are not limited to any particular ones, provided that the amino-formaldehyde resins are each a compound obtained through a reaction between an amino compound and an aldehyde in the presence of an alkaline catalyst. Examples of the amino compound encompass: melamine; 6-substituted guanamines such as guanamine, acetoguanamine, and benzoguanamine; amine-substituted triazine compounds such as CTU guanamine (3,9-bis[2-(3,5-diamino-2,4,6-triazaphenyl)ethyl]-2,4,8,10-tetraoxaspiro[5,5]undecane) and CMTU guanamine (3,9-bis[(3,5-diamino-2,4,6-triazaphenyl) methyl]-2,4,8,10-tetraoxaspiro[5,5]undecane); and ureas such as urea, thiourea, and ethyleneurea. Examples of the amino compound also encompass: (a) substituted melamine compounds which are different from melamine in that the hydrogen of an amino group is substituted by an alkyl group, an alkenyl group, and/or a phenyl group (described in Specification of U.S. Pat. No. 5,998,573 (a Japanese family member thereof: Japanese Patent Application Publication Tokukaihei No. 9-143238)); and (b) substituted melamine compounds which are different from melamine in that the hydrogen of an amino group is substituted by a hydroxyalkyl group, a hydroxyalkyloxyalkyl group, and/or an aminoalkyl group (described in Specification of U.S. Pat. No. 5,322,915 (a Japanese family member thereof: Japanese Patent Application Publication Tokukaihei No. 5-202157)). Out of the above-listed compounds, melamine, guanamine, acetoguanamine and benzoguanamine, which are polyfunctional amino compounds, are preferable, and melamine is particularly preferable, as the amino compound, because they are industrially produced and inexpensive. The above-listed amino compounds may be used alone or in combination of two or more. In addition to these amino compounds, any of (a) phenols, such as phenol, cresol, alkylphenol, resorcin, hydroquinone, and/or pyrogallol, (b) anilines, and the like may be used.

Examples of the aldehyde encompass formaldehyde, paraformaldehyde, acetaldehyde, benzaldehyde, and furfural. Preferred aldehydes are formaldehyde and paraformaldehyde, because they are inexpensive and well react with the foregoing amino compound. In producing an amino-formaldehyde resin, it is preferable to use the aldehyde in the following amount: the amount of an effective aldehyde group in the aldehyde compound may be 1.1 mol to 6.0 mol, or 1.2 mol to 4.0 mol, per mole of the amino compound.

As the matrix resin (B), an epoxy resin is particularly preferable.

(Physical Properties of Matrix Resin (B))

The matrix resin (B) is not particularly limited in terms of the properties thereof. The matrix resin (B) may have a viscosity of 100 mPa·s to 1,000,000 mPa·s at 25° C. The viscosity of the matrix resin (B) may be not more than 50,000 mPa·s, not more than 30,000 mPa·s, and or not more than 15,000 mPa·s, at 25° C. According to the above feature, the matrix resin (B) has an advantage of having excellent flowability. It can also be said that the matrix resin (B) having a viscosity of 100 mPa·s to 1,000,000 mPa·s at 25° C. is a liquid.

As the flowability of the matrix resin (B) becomes greater, in other words, as the viscosity of the matrix resin (B) becomes lower, it becomes more difficult to disperse, in the matrix resin (B), the polymer particles (A) in the form of primary particles. Conventionally, it has been extremely difficult to disperse, in the matrix resin (B) having a viscosity of not more than 1,000,000 mPa·s at 25° C., the polymer particles (A) in the form of primary particles. However, the resin composition in accordance with one or more embodiments of the present invention has an advantage that the polymer particles (A) having the above feature are well dispersed in the matrix resin (B) having a viscosity of not more than 1,000,000 mPa·s at 25° C.

Furthermore, the viscosity of the matrix resin (B) may be not less than 100 mPa·s, not less than 500 mPa·s, not less than 1000 mPa·s, and or not less than 1500 mPa·s at 25° C., because such a viscosity allows the matrix resin (B) to get between the polymer particles (A) and thereby allows prevention of fusion between the polymer particles (A).

The matrix resin (B) may have a viscosity of more than 1,000,000 mPa·s. The matrix resin (B) may be a semisolid (semiliquid) or may be alternatively a solid. In a case where the matrix resin (B) has a viscosity of more than 1,000,000 mPa·s, the resultant resin composition has advantages that the resin composition is less sticky and easy to handle.

The matrix resin (B) may have an endothermic peak at not higher than 25° C., or not higher than 0° C., in its differential scanning calorimetry (DSC) thermogram. According to the above feature, the matrix resin (B) has an advantage of having excellent flowability.

(2-4. Blending Ratio Between Polymer Particles (A) and Matrix Resins (B), etc.)

The blending ratio between the polymer particles (A) and the matrix resin (B) is preferable that the polymer particles (A) are contained in an amount of not less than 20% by weight and the matrix resin (B) is contained in an amount of not more than 80% by weight, where 100% by weight represents the total amount of the polymer particles (A) and the matrix resin (B). It can be said that a resin composition containing the polymer particles (A) in an amount of not less than 20% by weight, where 100% by weight represents the total amount of the polymer particles (A) and the matrix resin (B), is a masterbatch. In a case where the resin composition is a masterbatch, the polymer particles (A) may be contained in an amount of 20% by weight to 50% by weight, the matrix resin (B) may be contained in an amount of 50% by weight to 80% by weight, the polymer particles (A) may be contained in an amount of 30% by weight to 50% by weight, the matrix resin (B) may be contained in an amount of 50% by weight to 70% by weight, the polymer particles (A) may be contained in an amount of 35% by weight to 50% by weight, the matrix resin (B) may be contained in an amount of 50% by weight to 65% by weight, the polymer particles (A) may be contained in an amount of 40% by weight to 50% by weight, the matrix resin (B) may be contained in an amount of 50% by weight to 60% by weight, the polymer particles (A) may be contained in an amount of 40% by weight, and the matrix resin (B) may be contained in an amount of 60% by weight, where 100% by weight represents the total amount of the polymer particles (A) and the matrix resin (B). Blending ratio between the polymer particles (A) and the matrix resin (B) which fall within the above ranges bring about an advantage of improved degree of freedom of blending. The present resin composition can achieve lower viscosity even in a case where the present resin composition contains the polymer particles (A) at a high concentration. In a case where the masterbatch is used to prepare a resin composition which contains the polymer particles (A) in a lesser amount, the polymer particles (A) may be contained in an amount of 1% by weight to 20% by weight, the matrix resin (B) may be contained in an amount of 80% by weight to 99% by weight, the polymer particles (A) may be contained in an amount of 1% by weight to 16% by weight, the matrix resin (B) may be contained in an amount of 84% by weight to 99% by weight, the polymer particles (A) contained in an amount of 1% by weight to 12% by weight, and the matrix resin (B) contained in an amount of 88% by weight to 99% by weight, where 100% by weight represents the total amount of the polymer particles (A) and the matrix resin (B).

(2-5. Other Optional Components)

The present resin composition may contain, as necessary, other optional component(s) which is different from the above-described components. Examples of other optional components encompass: inorganic fillers; organic fillers; anti-blocking agents; curing agents; coloring agents such as pigments and colorants; extenders; ultraviolet ray absorbing agents; antioxidants; heat stabilizers (antigelling agents); plasticizing agents; leveling agents; defoaming agents; silane coupling agents; antistatic agents; flame retardants; lubricants; viscosity reducers; shrinkage reducing agents; desiccants; and dispersion agents.

Other optional components can be added, as appropriate, during any step in a method of producing the present resin composition. For example, other optional components can be added to an aqueous suspension before or after flocculation of the polymer particles (A). Alternatively, other optional components can be added to the present resin composition.

(Inorganic Filler)

The present resin composition can contain an inorganic filler as described above. The present resin composition has no functional groups that react with an inorganic filler, it is possible to achieve lower viscosity even in a case where the present resin composition contains an inorganic filler. Examples of the inorganic filler encompass silicic acid, silicate, dolomite, a reinforcing filler, calcium oxide, calcium carbonate, magnesium carbonate, titanium oxide, ferric oxide, aluminum hydroxide, fine aluminum powder, zinc oxide, and active zinc oxide. In a case where the present resin composition contains an inorganic filler, the present resin composition has an advantage of being economical and resulting in a cured product that has excellent strength and flame retardancy.

Examples of the silicic acid encompass wet silica and dry silica.

The dry silica is also referred to as fumed silica. Examples of the dry silica encompass non-surface treated hydrophilic fumed silica, and hydrophobic fumed silica produced by chemically treating the silanol group part of hydrophilic fumed silica with silane and/or siloxane. The dry silica may be (a) hydrophilic fumed silica from the viewpoint of its excellent workability and (b) hydrophobic fumed silica from the viewpoint of its excellent dispersibility in the matrix resin (B) and of excellent storage stability of a resin composition to be obtained.

Examples of a method for producing the dry silica encompass, but are not particularly limited to, (a) an aerosil method in which dry silica is produced by the degradation of a silicon halide and (b) an arc process in which silica sand is heated and reduced and then the resultant product is oxidized by air so as to obtain silicic acid. Dry silica may be produced by an aerosil method, from the viewpoint of availability.

Examples of the surface treating agent for the hydrophobic fumed silica encompass silane coupling agent, octamethyltetracyclosiloxane, and polydimethylsiloxane. Examples of the silane coupling agent encompass dimethyldichlorosilane, (meth)acrylic silane, hexamethyldisilazane, octylsilane, hexadecylsilane, aminosilane, and methacrylic silane. From the viewpoint of excellent stable dispersion in the matrix resin (B) and of excellent storage stability of a resin composition to be obtained, a hydrophobic fumed silica which has been surface treated with polydimethylsiloxane is preferable.

In a case where the present resin composition contains dry silica as an inorganic filler, the shear rate dependency of the viscosity of the resin composition becomes high.

Examples of the silicate encompass aluminum silicate, magnesium silicate, calcium silicate, wollastonite, and talc.

Examples of the calcium carbonate encompass heavy calcium carbonate and colloidal calcium carbonate.

In general, colloidal calcium carbonate may be produced by adding water to quick lime so as to obtain milk of lime and then reacting the milk of lime with carbon dioxide gas. Colloidal calcium carbonate is calcium carbonate having uniform particles, and may be also referred to as "precipitated calcium carbonate" or "synthetic calcium carbonate".

From an economical viewpoint, the inorganic filler may contain calcium carbonate.

The inorganic filler may be surface treated with use of a surface treating agent. Surface treatment improves the dispersibility of the inorganic filler in a resin composition and, as a result, improves various physical properties of the resulting cured product.

Examples of the surface treating agent for the inorganic filler encompass: fatty acids such as saturated fatty acid and unsaturated fatty acid; resin acids; and a silane coupling agent.

The amount of the inorganic filler contained in 100% by weight of the resin composition may be 0.1% by weight to 60.0% by weight, 0.5% by weight to 55.0% by weight, or 1.0% by weight to 50.0% by weight. In a case where the amount of the inorganic filler contained in 100% by weight of the resin composition is not less than 0.1% by weight, the resin composition can provide a cured product having excellent adhesiveness. In a case where the amount of the inorganic filler contained in 100% by weight of the resin composition is not more than 60.0% by weight, a decrease in elongation property resulting from the inorganic filler will not become remarkable, so that the resin composition can provide a cured product having excellent elongation property. The amount of the inorganic filler contained in 100% by weight of the resin composition can be 0.1% by weight to 15.0% by weight, 0.5% by weight to 10.0% by weight, or 1.0% by weight to 5.0% by weight.

The inorganic filler may be used alone or in combination of two or more.

(Calcium Oxide)

As described above, the present resin composition can contain calcium oxide as an inorganic filler. In a case where the present resin composition contains calcium oxide as an inorganic filler, the calcium oxide removes water content from the resin composition by reacting with the water content in the resin composition, and thereby can ameliorate water-caused problems regarding various physical properties. The calcium oxide can, for example, serve as a bubble-preventing agent by removing water content, and prevent or reduce a decrease in the adhesion strength of the resulting cured product.

The calcium oxide can be surface treated with use of a surface treating agent. Surface treatment improves the dispersibility of the calcium oxide in a resin composition. As a result, using surface-treated calcium oxide, as compared to non-surface-treated calcium oxide, improves physical properties such as adhesion strength of the resulting cured product. In particular, surface-treated calcium oxide can markedly improve the T-peel adhesiveness and impact-peel-resistant adhesiveness of the resulting cured product. The surface treating agent that can be used in the surface treatment of the calcium oxide is not particularly limited but may be a fatty acid.

In a case where the present resin composition contains calcium oxide as an inorganic filler, the calcium oxide content of the resin composition may be 0.1 parts by weight to 10 parts by weight, 0.2 parts by weight to 5 parts by weight, 0.5 parts by weight to 3 parts by weight, or 1 part by weight to 2 parts by weight, with respect to 100 parts by weight of the matrix resin (B). (a) In a case where the calcium oxide content is not less than 0.1 parts by weight with respect to 100 parts by weight of the matrix resin (B), the effect of water content removal is sufficient. (b) In a case where the calcium oxide content is not more than 10 parts by weight with respect to 100 parts by weight of the matrix resin (B), the risk of a decrease in the strength of the resulting cured product can be avoided.

The calcium oxide may be used alone or in combination of two or more.

The present resin composition can contain a dehydrating agent other than the calcium oxide. Examples of the dehydrating agent other than the calcium oxide include the various compounds disclosed in paragraph [0155] of the specification of WO 2014-196607.

(Aluminum Hydroxide)

As described above, the present resin composition can contain aluminum hydroxide as an inorganic filler. Aluminum hydroxide is a white powder crystal represented by the following chemical formula: $Al(OH)_3$ or $Al_2O_3 \cdot 3H_2O$. Aluminum hydroxide is in general produced by a Bayer process with bauxite as a raw material. There are various products of aluminum hydroxide that have various average particle sizes distinguished by classification of aluminum hydroxide.

In a case where the present resin composition contains aluminum hydroxide as an inorganic filler, the aluminum hydroxide content of the resin composition may be 55% by weight to 85% by weight with respect to 100% by weight of the resin composition. The addition of aluminum hydroxide brings about an advantage that the resulting cured product has excellent thermal conductivity and excellent flame retardancy.

(2-6. Physical Properties of Resin Composition)

The present resin composition has low viscosity, and therefore has an advantage of excellent handleability. In one or more embodiments of the present invention, the following determination is made for the resin composition which contains no inorganic filler: if the viscosity of the resin composition at 50° C. is not more than 20,900 mPa·s, the resin composition (containing no inorganic filler) has low viscosity and excellent handleability. In the present specification, “viscosity of the resin composition at X° C.” is intended to mean “viscosity of the resin composition having a temperature of X° C.”. In a case where the present resin composition contains no inorganic filler, the viscosity of the resin composition at 50° C. may be not more than 20,900 mPa·s, not more than 20,500 mPa·s, not more than 20,000 mPa·s, not more than 18,000 mPa·s, not more than 15,000 mPa·s, not more than 14,000 mPa·s, not more than 13,000 mPa·s, not more than 12,000 mPa·s, or not more than 11,000 mPa·s. According to the above feature, the resin composition also has an advantage of having excellent flowability.

The present resin composition has an advantage of having excellent handleability even when further containing an inorganic filler. In one or more embodiments of the present invention, the following determination is made for the resin composition which further contains an inorganic filler: if the viscosity of the resin composition at 25° C. is not more than 280,000 mPa·s, the resin composition (containing the inorganic filler) has low viscosity and excellent handleability. In a case where the present resin composition further contains an inorganic filler, the viscosity of the resin composition at 25° C. may be not more than 280,000 mPa·s, not more than 250,000 mPa·s, not more than 230,000 mPa·s, not more than 200,000 mPa·s, not more than 170,000 mPa·s, not more than 150,000 mPa·s, not more than 140,000 mPa·s, not more than 130,000 mPa·s, not more than 120,000 mPa·s, or not more than 110,000 mPa·s. According to the above feature, the resin composition also has an advantage of having excellent flowability.

The present resin composition has an advantage of having excellent handleability even when containing the polymer particles (A) at a high concentration (for example, not less than 20% by weight). A case where the polymer particles (A) content of the resin composition is not less than 20% by weight with respect to 100% by weight of the total amount of the polymer particles (A) and the matrix resin (B) and where the resin composition contains no inorganic filler (case (5)) will be described. In the case (5), when the viscosity of the resin composition at 50° C. is not more than 20,900 mPa·s, it is determined that the viscosity of the resin composition (containing no inorganic filler) is low, and the handleability is excellent. In the case (5), the viscosity of the resin composition at 50° C. may be not more than 20,900 mPa·s, not more than 20,500 mPa·s, not more than 20,000 mPa·s, not more than 18,000 mPa·s, not more than 15,000 mPa·s, not more than 14,000 mPa·s, not more than 13,000 mPa·s, not more than 12,000 mPa·s, or not more than 11,000 mPa·s. According to the above feature, the resin composition also has an advantage of having excellent flowability.

The present resin composition has an advantage of having excellent handleability even when containing the polymer particles (A) at a higher concentration (for example, not less than 40% by weight). A case where the polymer particles (A) content of the resin composition is not less than 40% by weight with respect to 100% by weight of the total amount of the polymer particles (A) and the matrix resin (B) and where the resin composition contains no inorganic filler (case (6)) will be described. In the case (6), when the viscosity of the resin composition at 50° C. is not more than 20,900 mPa·s, it is determined that the viscosity of the resin composition (containing no inorganic filler) is low, and the handleability is excellent. In the case (6), the viscosity of the resin composition at 50° C. may be not more than 20,900 mPa·s, not more than 20,500 mPa·s, not more than 20,000 mPa·s, not more than 18,000 mPa·s, not more than 15,000 mPa·s, not more than 14,000 mPa·s, not more than 13,000 mPa·s, not more than 12,000 mPa·s, or not more than 11,000 mPa·s. According to the above feature, the resin composition also has an advantage of having excellent flowability.

(2-7. Method for Producing Resin Composition)

As described above, the present resin composition may be arranged so that the polymer particles (A) are dispersed in the form of primary particles in the matrix resin (B). Various methods can be used as a method of obtaining a composition in which the polymer particles (A) are dispersed in the form of primary particles in the matrix resin (B) (i.e., a method of producing the present resin composition). Examples of the method of producing the present resin composition encompass (i) a method in which polymer particles (A) obtained in the form of an aqueous latex are brought into contact with a matrix resin (B) and then an unnecessary component such as water is removed and (ii) a method in which polymer particles (A) obtained in the form of an aqueous latex are extracted into an organic solvent and then the resultant organic solvent solution of the polymer particles (A) is mixed with a matrix resin (B), and then the organic solvent is removed. A method disclosed in PCT International Publication No. WO 2005/028546 may be used as the method of producing the present resin composition. The specific method of producing the present resin composition includes the following steps in order: (i) a first step of mixing an aqueous latex containing polymer particles (A) (specifically a reaction mixture obtained by producing the polymer particles (A) by emulsion polymerization) with an organic solvent having a water solubility of 5% by weight to 40% by weight at 20° C. and then an excess amount of water is added to and mixed with the resultant mixture so as to agglutinate the polymer particles (A), (ii) a second step of separating and collecting the agglutinated polymer particles (A) from the mixture (liquid phase) and then once again mixing the collected polymer particles (A) with the organic solvent so as to obtain an organic solvent solution of the polymer particles (A), and (iii) a third step of mixing the resultant organic solvent solution with the matrix resin (B) and then distilling off the organic solvent. The present resin composition may be prepared by the above production method including the first step, the second step, and the third step.

The matrix resin (B) may be in the form of a liquid at 23° C. for the third step to be easy. The phrase, "the matrix resin (B) is in the form of a liquid at 23° C.", means that the softening point of the matrix resin (B) is not higher than 23° C. and that the matrix resin (B) exhibits flowability at 23.

[3. Cured Product]

A cured product in accordance with one or more embodiments of the present invention is obtained by curing the resin composition discussed in [2. Resin composition]. In the present disclosure, the "cured product in accordance with one or more embodiments of the present invention" may also simply be referred to as a "present cured product".

The present cured product has the above-described feature. Therefore, even in a case where the resin composition is applied to a metal plate or the like and is then cured, rust is less likely to form. Moreover, the cured product has (a) an excellent surface appearance, (b) high rigidity and a high elastic modulus, and (c) excellent toughness and excellent adhesiveness.

[4. Other Uses]

The present resin composition described above can be used in various applications, and the applications are not limited to any particular ones. The present resin composition etc. each may be used in applications such as, for example, adhesive agents, coating materials, binders for reinforcement fibers, composite materials, molding materials for 3D printers, sealants, electronic substrates, ink binders, wood chip binders, binders for rubber chips, foam chip binders, binders for castings, rock mass consolidation materials for floor materials and ceramics, and urethane foams. Examples of the adhesive agent encompass a one-component type adhesive agent and a two-component type adhesive agent. In a case where the present resin composition is used as the adhesive agent, an epoxy curing agent may be used. Various types of epoxy curing agents can be used as the epoxy curing agent. Examples of the epoxy curing agent encompass aromatic amine. Examples of the urethane foams encompass automotive seats, automotive interior parts, sound absorbing materials, damping materials, shock absorbers (shock absorbing materials), heat insulating materials, and floor material cushions for construction.

The present resin composition may be used for, out of the above applications, adhesive agents, coating materials, binders for reinforcement fibers, composite materials, molding materials for 3D printers, sealants, and electronic substrates.

One or more embodiments of the present invention may be configured as follows.

[X1] A resin composition containing polymer particles (A) and a matrix resin (B), the polymer particles (A) having a graft part, the graft part being a polymer that (i) (i-a) contains no structural unit containing an aromatic group or (i-b) contains, in 100% by weight of the graft part, more than 0% by weight but not more than 10% by weight of a structural unit containing an aromatic group, (ii) contains at least one selected from the group consisting of a structural unit derived from alkyl methacrylate and a structural unit derived from alkyl acrylate, and (iii) contains no structural unit containing an alkoxy group, no structural unit containing an aryloxy group, no structural unit containing an oxetane group, no structural unit containing a hydroxy group, no structural unit containing an amino group, no structural unit containing an imide group, no structural unit containing a carboxylic acid group, no structural unit containing a carboxylic anhydride group, no structural unit containing a cyclic ester group, no structural unit containing a cyclic amide group, no structural unit containing a benzoxazine group, and no structural unit containing a cyanate ester group, and the graft part having a glass transition temperature of −25° C. to 18° C.

[X2] The resin composition described in [X1], in which the polymer particles (A) are contained in an amount of 20% by weight to 50% by weight and the matrix resin (B) is contained in an amount of 50% by weight to 80% by weight, where 100% by weight represents a total amount of the polymer particles (A) and the matrix resin (B).

[X3] A resin composition containing polymer particles (A) and a matrix resin (B), the polymer particles (A) having a graft part, the graft part being a polymer that, in 100% by weight of the graft part, (i) (i-a) contains no structural unit containing an aromatic group or (i-b) contains more than 0% by weight but not more than 10% by weight of a structural unit containing an aromatic group, and (ii) contains not less than 50% by weight of at least one selected from the group consisting of a structural unit derived from alkyl methacrylate and a structural unit derived from alkyl acrylate, the graft part having a glass transition temperature of −25° C. to 18° C., and the polymer particles (A) being contained in an amount of 20% by weight to 50% by weight and the matrix resin (B) being contained in an amount of 50% by weight to 80% by weight, where 100% by weight represents a total amount of the polymer particles (A) and the matrix resin (B).

[X4] The resin composition described in any one of [X1] through [X3], in which the graft part contains no structural unit containing an aromatic group.

[X5] The resin composition described in any one of [X1] through [X4], in which the polymer particles (A) have a volume-average particle size of 0.15 μm to 0.30 μm.

[X6] The resin composition described in any one of [X1] through [X5], in which in 100% by weight of the graft part, the graft part contains more than 0% by weight but not more than 50% by weight of a structural unit having an epoxy group.

[X7] The resin composition described in any one of [X1] through [X6], in which in 100% by weight of the graft part, the graft part contains not less than 20% by weight of a structural unit derived from a monomer that provides a homopolymer having a glass transition temperature of not higher than 0° C.

[X8] The resin composition described in any one of [X1] through [X7], in which the resin composition has a viscosity of not more than 20,000 mPa·s at 50° C.

[X9] The resin composition described in any one of [X1] through [X8], in which: the polymer particles (A) are contained in an amount of 40% by weight to 50% by weight, where 100% by weight represents a total amount of the polymer particles (A) and the matrix resin (B); and the resin composition has a viscosity of not more than 20,000 mPa·s at 50° C.

[X10] The resin composition described in any one of [X1] through [X9], further containing an inorganic filler.

[X11] The resin composition described in any one of [X1] through [X10], in which the matrix resin (B) is an epoxy resin.

One or more embodiments of the present invention may be configured as follows.

[Y1] A resin composition containing polymer particles (A) and a matrix resin (B), the polymer particles (A) having a graft part, the graft part being a polymer that (i) (i-a) contains no structural unit containing an aromatic group or (i-b) contains, in 100% by weight of the graft part, more than 0% by weight but not more than 10% by weight of a structural unit containing an aromatic group, (ii) contains at least one selected from the group consisting of a structural unit derived from alkyl methacrylate and a structural unit derived from alkyl acrylate, and (iii) contains no structural unit containing an alkoxy group, no structural unit containing an aryloxy group, no structural unit containing an oxetane group, no structural unit containing a hydroxy group, no structural unit containing an amino group, no structural unit containing an imide group, no structural unit containing a carboxylic acid group, no structural unit containing a carboxylic anhydride group, no structural unit containing a cyclic ester group, no structural unit containing a cyclic amide group, no structural unit containing a benzoxazine group, and no structural unit containing a cyanate ester group, and the graft part having a glass transition temperature of −25° C. to 18° C.

[Y2] The resin composition described in [Y1], in which the polymer particles (A) are contained in an amount of 20% by weight to 50% by weight and the matrix resin (B) is contained in an amount of 50% by weight to 80% by weight, where 100% by weight represents a total amount of the polymer particles (A) and the matrix resin (B).

[Y3] A resin composition containing polymer particles (A) and a matrix resin (B), the polymer particles (A) having a graft part, the graft part being a polymer that, in 100% by weight of the graft part, (i) (i-a) contains no structural unit containing an aromatic group or (i-b) contains more than 0% by weight but not more than 10% by weight of a structural unit containing an aromatic group, and (ii) (ii-a) contains at least one selected from the group consisting of a structural unit derived from alkyl methacrylate and a structural unit derived from alkyl acrylate (ii-b) in a total amount of not less than 50% by weight, the graft part having a glass transition temperature of −25° C. to 18° C., and the polymer particles (A) being contained in an amount of 20% by weight to 50% by weight and the matrix resin (B) being contained in an amount of 50% by weight to 80% by weight, where 100% by weight represents a total amount of the polymer particles (A) and the matrix resin (B).

[Y4] The resin composition described in any one of [Y1] through [Y3], in which the graft part contains no structural unit containing an aromatic group.

[Y5] The resin composition described in any one of [Y1] through [Y4], in which the polymer particles (A) have a volume-average particle size of 0.15 μm to 0.30 μm.

[Y6] The resin composition described in any one of [Y1] through [Y5], in which in 100% by weight of the graft part, the graft part contains more than 0% by weight but not more than 50% by weight of a structural unit having an epoxy group.

[Y7] The resin composition described in any one of [Y1] through [Y6], in which in 100% by weight of the graft part, the graft part contains not less than 20% by weight of a structural unit derived from a monomer that provides a homopolymer having a glass transition temperature of not higher than 0° C.

[Y8] The resin composition described in any one of [Y1] through [Y7], in which the resin composition has a viscosity of not more than 20,000 mPa·s at 50° C.

[Y9] The resin composition described in any one of [Y1] through [Y8], in which: the polymer particles (A) are contained in an amount of 40% by weight to 50% by weight, where 100% by weight represents a total amount of the polymer particles (A) and the matrix resin (B); and the resin composition has a viscosity of not more than 20,000 mPa·s at 50° C.

[Y10] The resin composition described in any one of [Y1] through [Y9], further containing an inorganic filler.

[Y11] The resin composition described in any one of [Y1] through [Y10], in which the matrix resin (B) is an epoxy resin.

EXAMPLES

The following description will discuss one or more embodiments of the present invention in more detail with reference to Examples and Comparative Examples. Note that one or more embodiments of the present invention are not limited to these examples. One or more embodiments of the present invention can be altered as appropriate within the scope of the gist disclosed herein. One or more embodiments of the present invention also include, in their technical scope, embodiments achieved by altering one or more embodiments.

[Evaluation Methods]

First, the following description will discuss methods of evaluating the resin compositions produced in the Examples and Comparative Examples.

<Measurement of Volume-Average Particle Size>

The volume-average particle size (Mv) of (a) an elastic body dispersed in an aqueous suspension and (b) polymer particles (A) dispersed in a latex was measured with use of Nanotrac WaveII-EX150 (manufactured by MicrotracBEL Corp.). A test specimen used for measurement was prepared by diluting the aqueous suspension or the latex in deionized water. When the measurement was made, the refractive index of water and the refractive index of the elastic body or the polymer particles (A) obtained in each of Production Examples were inputted, measurement time was set to 120 seconds, and the concentration of the test specimen was adjusted such that a load index fell within the range of 1 to 20.

<Measurement of Viscosity>

The viscosity of the liquid epoxy resin (JER828, manufactured by Mitsubishi Chemical Corporation), which was the matrix resin (B) used in each of Examples and Comparative Examples below, or the viscosity of a resin composition obtained in each of Examples and Comparative Examples below was measured. A device used was a digital viscometer DV-II+Pro manufactured by BROOKFIELD FIELD. Further, a spindle CPE-52 was used for some viscosity ranges. The viscosity was measured at a temperature of 25° C. or 50° C., while a shear rate was changed as necessary. As a result, the viscosity of the liquid epoxy resin, which was the matrix resin (B), was 12,000 mPa·s.

<Tg of Graft Part>

Tg of the graft part was calculated with use of the Tg value of a homopolymer of the monomers below, according to the above Mathematical Formula 1.

Methyl methacrylate (MMA) 105° C.
Ethyl acrylate (EA) −20° C.
n-butyl acrylate (BA) −54° C.
Methyl acrylate (MA) 8° C.
Glycidyl methacrylate (GMA) 46° C.
Styrene (St) 80° C.
4-hydroxybutyl acrylate (4HBA) −40° C.
2-methoxyethyl methacrylate (MEMA) 16° C.

1. Formation of Elastic Body by Polymerization

Production Example 1-1: Preparation of Aqueous Suspension (R-1) that Contains Elastic Body Containing Polybutadiene Rubber as Main Component Into a pressure-resistant polymerization apparatus were introduced 200 parts by weight of deionized water, 0.03 parts by weight of tripotassium phosphate, 0.002 parts by weight of disodium ethylenediaminetetraacetate (EDTA), 0.001 parts by weight of ferrous sulfate heptahydrate, and 1.55 parts by weight of sodium dodecylbenzenesulfonate (SDBS) as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. After that, 100 parts by weight of butadiene (Bd) was introduced into the pressure-resistant polymerization apparatus, and the temperature inside the pressure-resistant polymerization apparatus was raised to 45° C. After that, 0.03 parts by weight of paramenthane hydroperoxide (PHP) was introduced into the pressure-resistant polymerization apparatus, and then 0.10 parts by weight of sodium formaldehyde sulfoxylate (SFS) was introduced into the pressure-resistant polymerization apparatus. Polymerization was then started. At the time 15 hours had elapsed from the start of the polymerization, residual monomers not used in the polymerization were removed by devolatilization under reduced pressure, and thereby the polymerization was ended. During the polymerization, PHP, EDTA, and ferrous sulfate heptahydrate were each added to the pressure-resistant polymerization apparatus in discretionarily selected amounts and discretionarily selected points in time. By the polymerization, an aqueous suspension (R-1), which contained an elastic body containing polybutadiene rubber as a main component, was obtained. The volume-average particle size of the elastic body contained in the obtained aqueous suspension (R-1) was 90 nm.

Production Example 1-2: Preparation of Aqueous Suspension (R-2) that Contains Elastic Body Containing Polybutadiene Rubber as Main Component Into a pressure-resistant polymerization apparatus were introduced 7 parts by weight of a solid content of the aqueous suspension (R-1) obtained in Production Example 1-1, 200 parts by weight of deionized water, 0.03 parts by weight of tripotassium phosphate, 0.002 parts by weight of EDTA, and 0.001 parts by weight of ferrous sulfate heptahydrate. Next, while the materials thus introduced were stirred, gas in the pressure-resistant polymerization apparatus was replaced with nitrogen, so as to sufficiently remove oxygen from the inside of the pressure-resistant polymerization apparatus. After that, 93 parts by weight of Bd was introduced into the pressure-resistant polymerization apparatus, and the temperature inside the pressure-resistant polymerization apparatus was raised to 45° C. After that, 0.02 parts by weight of PHP was introduced into the pressure-resistant polymerization apparatus, and then 0.10 parts by weight of SFS was introduced into the pressure-resistant polymerization apparatus. Polymerization was then started. At the time 30 hours had elapsed from the start of the polymerization, residual monomers not used in the polymerization were removed by devolatilization under reduced pressure, and thereby the polymerization was ended. During the polymerization, PHP, EDTA, ferrous sulfate heptahydrate, and SDBS were each added to the pressure-resistant polymerization apparatus in discretionarily selected amounts and discretionarily selected points in time. By the polymerization, an aqueous suspension (R-2), which contained an elastic body containing polybutadiene rubber as a main component, was obtained. The volume-average particle size of the elastic body contained in the obtained aqueous suspension (R-2) was 195 nm.

Production Examples 1-3: Preparation of Aqueous Suspension (R-3) that Contains Elastic Body Containing Polybutadiene Rubber as Main Component Into a pressure-resistant polymerization apparatus were introduced 200 parts by weight of deionized water, 0.03 parts by weight of tripotassium phosphate, 0.002 parts by weight of disodium ethylenediaminetetraacetate (EDTA), 0.001 parts by weight of ferrous sulfate heptahydrate, and 0.15 parts by weight of sodium dodecylbenzenesulfonate (SDBS) as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. After that, 100 parts by weight of butadiene (Bd) was introduced into the pressure-resistant polymerization apparatus, and the temperature inside the pressure-resistant polymerization apparatus was raised to 45° C. After that, 0.03 parts by weight of paramenthane hydroperoxide (PHP) was introduced into the pressure-resistant polymerization apparatus, and then 0.10 parts by weight of sodium formaldehyde sulfoxylate (SFS) was introduced into the pressure-resistant polymerization apparatus. Polymerization was then started. At the time 15 hours had elapsed from the start of the polymerization, residual monomers not used in the polymerization were removed by devolatilization under reduced pressure, and thereby the polymerization was ended. During the polymerization, PHP, EDTA, and ferrous sulfate heptahydrate were each added to the pressure-resistant polymerization apparatus in discretionarily selected amounts and discretionarily selected points in time. By the polymerization, an aqueous suspension (R-3), which contained an elastic body containing polybutadiene rubber as a main component, was obtained. The volume-average particle size of the elastic body contained in the obtained aqueous suspension (R-3) was 120 nm.

2. Preparation of Polymer Particles (A) (Polymerization of Graft Part)

Production Example 2-1: Preparation of Latex (L-1) Containing Polymer Particles (A)

Into a glass reaction vessel were introduced 250 parts by weight of the aqueous suspension (R-2) (including 87 parts by weight of the elastic body containing polybutadiene rubber as a main component) and 50 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.004 parts by weight of EDTA, 0.001 parts by weight of ferrous sulfate heptahydrate, and 0.20 parts by weight of SFS were added to the glass reaction vessel, and a resulting mixture was stirred for 10 minutes. Thereafter, a mixture of (i) a monomer for forming the graft part (hereinafter also referred to as "graft monomer") (6.0 parts by weight of n-butyl acrylate (BA), 5.2 parts by weight of methyl acrylate (MA), and 1.8 parts by weight of glycidyl methacrylate (GMA)) and (ii) 0.035 parts by weight t-butyl hydroperoxide (BHP) was added continuously into the glass reaction vessel over 80 minutes. Then, 0.013 parts by weight of BHP was added to the glass reaction vessel, and the resultant mixture in the glass reaction vessel was stirred for another hour so as to finish polymerization. Through the above operations was obtained a latex (L-1) containing polymer particles (A) and an emulsifying agent. Not less than 96% by weight of the monomer component had been polymerized. The volume-average particle size of the polymer particles (A) contained in the obtained latex (L-1) was 200 nm. The solid concentration (concentration of the polymer particles (A)) in the obtained latex (L-1) was 30% by weight with respect to 100% by weight of the latex (L-1). The graft part of the polymer particles (A) contained 14% by weight of the structural unit having an epoxy group with respect to 100% by weight of the graft part.

Production Example 2-2: Preparation of Latex (L-2) Containing Polymer Particles (A)

A latex (L-2) was obtained as in Production Example 2-1, except that 9.2 parts by weight of ethyl acrylate (EA), 2.0 parts by weight of n-butyl acrylate (BA), and 1.8 parts by weight of glycidyl methacrylate (GMA) were used as the graft monomer. Not less than 96% by weight of the monomer component had been polymerized. The volume-average particle size of the polymer particles (A) contained in the obtained latex (L-2) was 200 nm. The solid concentration (concentration of the polymer particles (A)) in the obtained latex (L-2) was 30% by weight with respect to 100% by weight of the latex (L-2). The graft part of the polymer particles (A) contained 14% by weight of the structural unit having an epoxy group with respect to 100% by weight of the graft part.

Production Example 2-3: Preparation of Latex (L-3) Containing Polymer Particles (A)

A latex (L-3) was obtained as in Production Example 2-1, except that 11.2 parts by weight of ethyl acrylate (EA) and 1.8 parts by weight of glycidyl methacrylate (GMA) were used as the graft monomer. Not less than 96% by weight of the monomer component had been polymerized. The volume-average particle size of the polymer particles (A) contained in the obtained latex (L-3) was 200 nm. The solid concentration (concentration of the polymer particles (A)) in the obtained latex (L-3) was 30% by weight with respect to 100% by weight of the latex (L-3). The graft part of the polymer particles (A) contained 14% by weight of the structural unit having an epoxy group with respect to 100% by weight of the graft part.

Production Example 2-4: Preparation of Latex (L-4) Containing Polymer Particles (A)

A latex (L-4) was obtained as in Production Example 2-1, except that 4.0 parts by weight of n-butyl acrylate (BA), 7.2 parts by weight of methyl acrylate (MA), and 1.8 parts by weight of glycidyl methacrylate (GMA) were used as the graft monomer. Not less than 96% by weight of the monomer component had been polymerized. The volume-average particle size of the polymer particles (A) contained in the obtained latex (L-4) was 200 nm. The solid concentration (concentration of the polymer particles (A)) in the obtained latex (L-4) was 30% by weight with respect to 100% by weight of the latex (L-4). The graft part of the polymer particles (A) contained 14% by weight of the structural unit having an epoxy group with respect to 100% by weight of the graft part.

Production Example 2-5: Preparation of Latex (L-5) Containing Polymer Particles (A)

A latex (L-5) was obtained as in Production Example 2-1, except that 11.2 parts by weight of methyl acrylate (MA) and 1.8 parts by weight of glycidyl methacrylate (GMA) were used as the graft monomer. Not less than 96% by weight of the monomer component had been polymerized. The volume-average particle size of the polymer particles (A) contained in the obtained latex (L-5) was 200 nm. The solid concentration (concentration of the polymer particles (A)) in the obtained latex (L-5) was 30% by weight with respect to 100% by weight of the latex (L-5). The graft part of the polymer particles (A) contained 14% by weight of the structural unit having an epoxy group with respect to 100% by weight of the graft part.

Production Example 2-6: Preparation of Latex (L-6) Containing Polymer Particles (A)

A latex (L-6) was obtained as in Production Example 2-1, except that 6.2 parts by weight of methyl methacrylate (MMA), 5.0 parts by weight of n-butyl acrylate (BA), and 1.8 parts by weight of glycidyl methacrylate (GMA) were used as the graft monomer. Not less than 96% by weight of the monomer component had been polymerized. The volume-average particle size of the polymer particles (A) contained in the obtained latex (L-6) was 200 nm. The solid concentration (concentration of the polymer particles (A)) in the obtained latex (L-6) was 30% by weight with respect to 100% by weight of the latex (L-6). The graft part of the polymer particles (A) contained 14% by weight of the structural unit having an epoxy group with respect to 100% by weight of the graft part.

Production Example 2-7: Preparation of Latex (L-7) Containing Polymer Particles (A)

A latex (L-7) was obtained as in Production Example 2-1, except that 6.0 parts by weight of n-butyl acrylate (BA), 4.0 parts by weight of methyl acrylate (MA), and 3.0 parts by weight of glycidyl methacrylate (GMA) were used as the graft monomer. Not less than 96% by weight of the monomer component had been polymerized. The volume-average particle size of the polymer particles (A) contained in the obtained latex (L-7) was 200 nm. The solid concentration (concentration of the polymer particles (A)) in the obtained latex (L-7) was 30% by weight with respect to 100% by weight of the latex (L-7). The graft part of the polymer particles (A) contained 23% by weight of the structural unit having an epoxy group with respect to 100% by weight of the graft part.

Production Example 2-8: Preparation of Latex (L-8) Containing Polymer Particles (A)

A latex (L-8) was obtained as in Production Example 2-6, except that (R-3) was used as the elastic body containing polybutadiene rubber as a main component. Not less than 96% by weight of the monomer component had been polymerized. The volume-average particle size of the polymer particles (A) contained in the obtained latex (L-8) was 130 nm. The solid concentration (concentration of the polymer particles (A)) in the obtained latex (L-8) was 30% by weight with respect to 100% by weight of the latex (L-8). The graft part of the polymer particles (A) contained 14% by weight of the structural unit having an epoxy group with respect to 100% by weight of the graft part.

Production Example 2-9: Preparation of Latex (L-9) Containing Polymer Particles (A)

A latex (L-9) was obtained as in Production Example 2-8, except that 2.2 parts by weight of methyl methacrylate (MMA), 5.0 parts by weight of n-butyl acrylate (BA), 4.0 parts by weight of styrene (St), and 1.8 parts by weight of glycidyl methacrylate (GMA) were used as the graft monomer. Not less than 96% by weight of the monomer component had been polymerized. The volume-average particle size of the polymer particles (A) contained in the obtained latex (L-9) was 130 nm. The solid concentration (concentration of the polymer particles (A)) in the obtained latex (L-9) was 30% by weight with respect to 100% by weight of the latex (L-9). The graft part of the polymer particles (A) contained 14% by weight of the structural unit having an epoxy group with respect to 100% by weight of the graft part. The graft part of the polymer particles (A) contained a structural unit that contained an aromatic group derived from St.

Production Example 2-10: Preparation of Latex (L-10) Containing Polymer Particles (A)

A latex (L-10) was obtained as in Production Example 2-1, except that 10.2 parts by weight of methyl methacrylate (MMA), 1.0 parts by weight of n-butyl acrylate (BA), and 1.8 parts by weight of glycidyl methacrylate (GMA) were used as the graft monomer. Not less than 96% by weight of the monomer component had been polymerized. The volume-average particle size of the polymer particles (A) contained in the obtained latex (L-10) was 200 nm. The solid concentration (concentration of the polymer particles (A)) in the obtained latex (L-10) was 30% by weight with respect to 100% by weight of the latex (L-10). The graft part of the polymer particles (A) contained 14% by weight of the structural unit having an epoxy group with respect to 100% by weight of the graft part.

Production Example 2-11: Preparation of Latex (L-11) Containing Polymer Particles (A)

A latex (L-11) was obtained as in Production Example 2-1, except that 9.2 parts by weight of methyl methacrylate (MMA), 2.0 parts by weight of 4-hydroxybutyl acrylate (4HBA), and 1.8 parts by weight of glycidyl methacrylate (GMA) were used as the graft monomer. Not less than 96% by weight of the monomer component had been polymerized. The volume-average particle size of the polymer particles (A) contained in the obtained latex (L-11) was 200 nm. The solid concentration (concentration of the polymer particles (A)) in the obtained latex (L-11) was 30% by weight with respect to 100% by weight of the latex (L-11). The graft part of the polymer particles (A) contained 14% by weight of the structural unit having an epoxy group with respect to 100% by weight of the graft part. The graft part of the polymer particles (A) contained a structural unit that contained a hydroxy group derived from 4HBA.

Production Example 2-12: Preparation of Latex (L-12) Containing Polymer Particles (A)

A latex (L-12) was obtained as in Production Example 2-1, except that 11.2 parts by weight of 2-methoxyethyl methacrylate (MEMA) and 1.8 parts by weight of glycidyl methacrylate (GMA) were used as the graft monomer. Not less than 96% by weight of the monomer component had been polymerized. The volume-average particle size of the polymer particles (A) contained in the obtained latex (L-12) was 200 nm. The solid concentration (concentration of the polymer particles (A)) in the obtained latex (L-12) was 30% by weight with respect to 100% by weight of the latex (L-12). The graft part of the polymer particles (A) contained 14% by weight of the structural unit having an epoxy group with respect to 100% by weight of the graft part. The graft part of the polymer particles (A) contained a structural unit that contained an alkoxy group derived from MEMA.

Production Example 2-13: Preparation of Latex (L-13) Containing Polymer Particles (A)

A latex (L-13) was obtained as in Production Example 2-8, except that 10.2 parts by weight of methyl methacrylate (MMA), 1.0 parts by weight of n-butyl acrylate (BA), and 1.8 parts by weight of glycidyl methacrylate (GMA) were used as the graft monomer. Not less than 96% by weight of the monomer component had been polymerized. The volume-average particle size of the polymer particles (A) contained in the obtained latex (L-13) was 130 nm. The solid concentration (concentration of the polymer particles (A)) in the obtained latex (L-13) was 30% by weight with respect to 100% by weight of the latex (L-13). The graft part of the polymer particles (A) contained 14% by weight of the structural unit having an epoxy group with respect to 100% by weight of the graft part.

Production Example 2-14: Preparation of Latex (L-14) Containing Polymer Particles (A)

A latex (L-14) was obtained as in Production Example 2-8, except that 2.2 parts by weight of methyl methacrylate (MMA), 9.0 parts by weight of n-butyl acrylate (BA), and 1.8 parts by weight of glycidyl methacrylate (GMA) were used as the graft monomer. Not less than 96% by weight of the monomer component had been polymerized. The volume-average particle size of the polymer particles (A) contained in the obtained latex (L-14) was 130 nm. The solid concentration (concentration of the polymer particles (A)) in the obtained latex (L-14) was 30% by weight with respect to 100% by weight of the latex (L-14). The graft part of the polymer particles (A) contained 14% by weight of the structural unit having an epoxy group with respect to 100% by weight of the graft part.

In all of the polymer particles (A) discussed above, the weight ratio of the elastic body of the graft part in the polymer particles (A) was 87/13.

Example 1

The temperature inside a 1 L mixing vessel was set to 30° C., and then 126 parts by weight of methyl ethyl ketone (MEK) was introduced into the mixing vessel. Subsequently, while the MEK in the mixing vessel was stirred, 143 parts by weight of the latex (L-1) containing the polymer particles (A) was introduced into the mixing vessel. The materials thus introduced were mixed uniformly. Thereafter, while the materials were stirred, 200 parts by weight of water (452 parts by weight in total) was introduced into the mixing vessel at a feed rate of 80 parts by weight/min. After the water was fed, the stirring was promptly stopped, and slurry containing a buoyant agglutinate was obtained.

Next, 350 parts by weight of the liquid phase was let out from an outlet in a lower part of the mixing vessel so that the agglutinate remained in the mixing vessel. To the obtained agglutinate (polymer particles (A) dope), 150 parts by weight of MEK was added. The agglutinate and the MEK were mixed to obtain an organic solvent solution in which the polymer particles (A) were dispersed. Into 277 parts by weight of this organic solvent solution (containing 42.9 parts by weight of the polymer particles (A)), 64 parts by weight of a liquid epoxy resin (manufactured by Mitsubishi Chemical Corporation; JER828) which was the matrix resin (B) was introduced. The resultant mixture was mixed and then MEK was distilled off under reduced pressure, so that a resin composition (A-1) was obtained. The resin composition (A-1) contained 40% by weight of the polymer particles (A) and 60% by weight of the matrix resin (B), where 100% by weight represents the total amount of the polymer particles (A) and the matrix resin (B).

Furthermore, 25 g of the resin composition (A-1), 85 g of the liquid epoxy resin (manufactured by Mitsubishi Chemical Corporation; JER828), and 100 g of silica (manufactured by Tatsumori Ltd.; CMC-12S) which was an inorganic filler were mixed with use of a planetary centrifugal mixer, so that a silica mixture (resin composition) was obtained. The weight ratio between the polymer particles (A), the matrix resin (B), and the inorganic filler of the silica mixture was 10:100:100. Table 1 shows the results.

Example 2

A resin composition (A-2) was obtained as in Example 1 except that the latex (L-2) was used as a latex containing polymer particles (A). The resin composition (A-2) contained 40% by weight of the polymer particles (A) and 60% by weight of the matrix resin (B), where 100% by weight represents the total amount of the polymer particles (A) and the matrix resin (B).

Furthermore, 25 g of the resin composition (A-2), 85 g of the liquid epoxy resin (manufactured by Mitsubishi Chemical Corporation; JER828), and 100 g of silica (manufactured by Tatsumori Ltd.; CMC-12S) which was an inorganic filler were mixed with use of a planetary centrifugal mixer, so that a silica mixture (resin composition) was obtained. The weight ratio between the polymer particles (A), the matrix resin (B), and the inorganic filler of the silica mixture was 10:100:100. Table 1 shows the results.

Example 3

A resin composition (A-3) was obtained as in Example 1 except that the latex (L-3) was used as a latex containing polymer particles (A). The resin composition (A-3) contained 40% by weight of the polymer particles (A) and 60% by weight of the matrix resin (B), where 100% by weight represents the total amount of the polymer particles (A) and the matrix resin (B).

Furthermore, 25 g of the resin composition (A-3), 85 g of the liquid epoxy resin (manufactured by Mitsubishi Chemical Corporation; JER828), and 100 g of silica (manufactured by Tatsumori Ltd.; CMC-12S) which was an inorganic filler were mixed with use of a planetary centrifugal mixer, so that a silica mixture (resin composition) was obtained. The weight ratio between the polymer particles (A), the matrix resin (B), and the inorganic filler of the silica mixture was 10:100:100. Table 1 shows the results.

Example 4

A resin composition (A-4) was obtained as in Example 1 except that the latex (L-4) was used as a latex containing polymer particles (A). The resin composition (A-4) contained 40% by weight of the polymer particles (A) and 60% by weight of the matrix resin (B), where 100% by weight represents the total amount of the polymer particles (A) and the matrix resin (B).

Furthermore, 25 g of the resin composition (A-4), 85 g of the liquid epoxy resin (manufactured by Mitsubishi Chemical Corporation; JER828), and 100 g of silica (manufactured by Tatsumori Ltd.; CMC-12S) which was an inorganic filler were mixed with use of a planetary centrifugal mixer, so that a silica mixture (resin composition) was obtained. The weight ratio between the polymer particles (A), the matrix resin (B), and the inorganic filler of the silica mixture was 10:100:100. Table 1 shows the results.

Example 5

A resin composition (A-5) was obtained as in Example 1 except that the latex (L-5) was used as a latex containing polymer particles (A). The resin composition (A-5) contained 40% by weight of the polymer particles (A) and 60% by weight of the matrix resin (B), where 100% by weight represents the total amount of the polymer particles (A) and the matrix resin (B).

Furthermore, 25 g of the resin composition (A-5), 85 g of the liquid epoxy resin (manufactured by Mitsubishi Chemical Corporation; JER828), and 100 g of silica (manufactured by Tatsumori Ltd.; CMC-12S) which was an inorganic filler were mixed with use of a planetary centrifugal mixer, so that a silica mixture (resin composition) was obtained. The weight ratio between the polymer particles (A), the matrix resin (B), and the inorganic filler of the silica mixture was 10:100:100. Table 1 shows the results.

Example 6

A resin composition (A-6) was obtained as in Example 1 except that the latex (L-6) was used as a latex containing polymer particles (A). The resin composition (A-6) contained 40% by weight of the polymer particles (A) and 60% by weight of the matrix resin (B), where 100% by weight represents the total amount of the polymer particles (A) and the matrix resin (B).

Furthermore, 25 g of the resin composition (A-6), 85 g of the liquid epoxy resin (manufactured by Mitsubishi Chemical Corporation; JER828), and 100 g of silica (manufactured by Tatsumori Ltd.; CMC-12S) which was an inorganic filler were mixed with use of a planetary centrifugal mixer, so that a silica mixture (resin composition) was obtained. The weight ratio between the polymer particles (A), the matrix resin (B), and the inorganic filler of the silica mixture was 10:100:100. Table 1 shows the results.

Example 7

A resin composition (A-7) was obtained as in Example 1 except that the latex (L-7) was used as a latex containing polymer particles (A). The resin composition (A-7) contained 40% by weight of the polymer particles (A) and 60% by weight of the matrix resin (B), where 100% by weight represents the total amount of the polymer particles (A) and the matrix resin (B).

Furthermore, 25 g of the resin composition (A-7), 85 g of the liquid epoxy resin (manufactured by Mitsubishi Chemical Corporation; JER828), and 100 g of silica (manufactured by Tatsumori Ltd.; CMC-12S) which was an inorganic filler were mixed with use of a planetary centrifugal mixer, so that a silica mixture (resin composition) was obtained. The weight ratio between the polymer particles (A), the matrix resin (B), and the inorganic filler of the silica mixture was 10:100:100. Table 1 shows the results.

Example 8

A resin composition (A-8) was obtained as in Example 1 except that the latex (L-8) was used as a latex containing polymer particles (A). The resin composition (A-8) contained 40% by weight of the polymer particles (A) and 60% by weight of the matrix resin (B), where 100% by weight represents the total amount of the polymer particles (A) and the matrix resin (B).

Furthermore, 25 g of the resin composition (A-8), 85 g of the liquid epoxy resin (manufactured by Mitsubishi Chemical Corporation; JER828), and 100 g of silica (manufactured by Tatsumori Ltd.; CMC-12S) which was an inorganic filler were mixed with use of a planetary centrifugal mixer, so that a silica mixture (resin composition) was obtained. The weight ratio between the polymer particles (A), the matrix resin (B), and the inorganic filler of the silica mixture was 10:100:100. Table 1 shows the results.

Comparative Example 1

A resin composition (A-9) was obtained as in Example 1 except that the latex (L-9) was used as a latex containing polymer particles (A). The resin composition (A-9) contained 40% by weight of the polymer particles (A) and 60% by weight of the matrix resin (B), where 100% by weight represents the total amount of the polymer particles (A) and the matrix resin (B).

Furthermore, 25 g of the resin composition (A-9), 85 g of the liquid epoxy resin (manufactured by Mitsubishi Chemical Corporation; JER828), and 100 g of silica (manufactured by Tatsumori Ltd.; CMC-12S) which was an inorganic filler were mixed with use of a planetary centrifugal mixer, so that a silica mixture was obtained. The weight ratio between the polymer particles (A), the matrix resin (B), and the inorganic filler of the silica mixture was 10:100:100. Table 1 shows the results.

Comparative Example 2

A resin composition (A-10) was obtained as in Example 1 except that the latex (L-10) was used as a latex containing polymer particles (A). The resin composition (A-10) contained 40% by weight of the polymer particles (A) and 60% by weight of the matrix resin (B), where 100% by weight represents the total amount of the polymer particles (A) and the matrix resin (B).

Furthermore, 25 g of the resin composition (A-10), 85 g of the liquid epoxy resin (manufactured by Mitsubishi Chemical Corporation; JER828), and 100 g of silica (manufactured by Tatsumori Ltd.; CMC-12S) which was an inorganic filler were mixed with use of a planetary centrifugal mixer, so that a silica mixture was obtained. The weight ratio between the polymer particles (A), the matrix resin (B), and the inorganic filler of the silica mixture was 10:100:100. Table 1 shows the results.

Comparative Example 3

A resin composition (A-11) was obtained as in Example 1 except that the latex (L-11) was used as a latex containing polymer particles (A). The resin composition (A-11) contained 40% by weight of the polymer particles (A) and 60% by weight of the matrix resin (B), where 100% by weight represents the total amount of the polymer particles (A) and the matrix resin (B).

Furthermore, 25 g of the resin composition (A-11), 85 g of the liquid epoxy resin (manufactured by Mitsubishi Chemical Corporation; JER828), and 100 g of silica (manufactured by Tatsumori Ltd.; CMC-12S) which was an inorganic filler were mixed with use of a planetary centrifugal mixer, so that a silica mixture was obtained. The weight ratio between the polymer particles (A), the matrix resin (B), and the inorganic filler of the silica mixture was 10:100:100. Table 1 shows the results.

Comparative Example 4

A resin composition (A-12) was obtained as in Example 1 except that the latex (L-12) was used as a latex containing polymer particles (A). The resin composition (A-12) contained 40% by weight of the polymer particles (A) and 60% by weight of the matrix resin (B), where 100% by weight represents the total amount of the polymer particles (A) and the matrix resin (B).

Furthermore, 25 g of the resin composition (A-12), 85 g of the liquid epoxy resin (manufactured by Mitsubishi Chemical Corporation; JER828), and 100 g of silica (manufactured by Tatsumori Ltd.; CMC-12S) which was an inorganic filler were mixed with use of a planetary centrifugal mixer, so that a silica mixture was obtained. The weight ratio between the polymer particles (A), the matrix resin (B), and the inorganic filler of the silica mixture was 10:100:100. Table 1 shows the results.

Comparative Example 5

A resin composition (A-13) was obtained as in Example 1 except that the latex (L-13) was used as a latex containing polymer particles (A). The resin composition (A-13) contained 40% by weight of the polymer particles (A) and 60% by weight of the matrix resin (B), where 100% by weight represents the total amount of the polymer particles (A) and the matrix resin (B).

Furthermore, 25 g of the resin composition (A-13), 85 g of the liquid epoxy resin (manufactured by Mitsubishi Chemical Corporation; JER828), and 100 g of silica (manufactured by Tatsumori Ltd.; CMC-12S) which was an inorganic filler were mixed with use of a planetary centrifugal mixer, so that a silica mixture was obtained. The weight ratio between the polymer particles (A), the matrix resin (B), and the inorganic filler of the silica mixture was 10:100:100. Table 1 shows the results.

Comparative Example 6

A resin composition (A-14) was obtained as in Example 1 except that the latex (L-14) was used as a latex containing polymer particles (A). The resin composition (A-14) contained 40% by weight of the polymer particles (A) and 60% by weight of the matrix resin (B), where 100% by weight represents the total amount of the polymer particles (A) and the matrix resin (B). However, the resultant resin composition (A-14) was gelatinized during degassing, and it was not possible to measure the viscosity at 50° C.

TABLE 1

| | Polymer particles (A) | | | | | | | | | | Resin composition | Silica mixture |
|---|---|---|---|---|---|---|---|---|---|---|---|---|
| | Particle size | Tg of graft part | Composition of graft part | | | | | | | | Viscosity of resin composition at 50 ° C. | Viscosity of silica mixture at 25° C. |
| | nm | ° C. | MMA | EA | BA | MA | GMA | St | 4HBA | MEMA | mPa · s | mPa · s |
| Example 1 | 200 | −21 | | | 6.0 | 5.2 | 1.8 | | | | 14,288 | 119,000 |
| Example 2 | 200 | −19 | | 9.2 | 2.0 | | 1.8 | | | | 12,224 | 125,000 |
| Example 3 | 200 | −13 | | 11.2 | | | 1 8 | | | | 10,795 | 110,000 |
| Example 4 | 200 | −11 | | | 4.0 | 7.2 | 1.8 | | | | 9,843 | 135,000 |
| Example 5 | 200 | 13 | | | | 11.2 | 1.8 | | | | 12,665 | 138,000 |
| Example 6 | 200 | 16 | 6.2 | | 5.0 | | 1.8 | | | | 12,938 | 103,000 |
| Example 7 | 200 | −19 | | | 6.0 | 4.0 | 3.0 | | | | 9,843 | 223,000 |
| Example 8 | 130 | 16 | 6.2 | | 5.0 | | 1.8 | | | | 19,209 | 123,000 |
| Comparative Example 1 | 130 | 11 | 2.2 | | 5.0 | | 1.8 | 4 | | | 20,955 | 125,000 |
| Comparative Example 2 | 200 | 76 | 10.2 | | 1.0 | | 1.8 | | | | 27,305 | 127,000 |
| Comparative Example 3 | 200 | 64 | 9.2 | | | | 1.8 | | 2.0 | | 35,404 | 152,000 |
| Comparative Example 4 | 200 | 20 | | | | | | | | 11.2 | 31,750 | 284,000 |
| Comparative Example 5 | 130 | 78 | 10.2 | | 1.0 | | 1.8 | | | | 30,639 | 138,000 |
| Comparative Example 6 | 130 | −26.5 | 2.2 | | 9.0 | | 1.8 | | | | Viscosity could not be measured due to gelatinization during degassing | — |

The resin compositions (A-1) through (A-8) of Examples 1 through 8 had viscosities of not more than 20,000 mPa·s at 50° C. In addition, the resin compositions (A-1) through (A-8) of Examples 1 through 8 had viscosities of not more than 230,000 mPa·s at 25° C. when the inorganic filler was added. In particular, the resin compositions (A-1) through (A-6) and (A-8) of Examples 1 through 6 and 8 had viscosities of not more than 140,000 mPa·s at 25° C. when the inorganic filler was added.

A resin composition in accordance an aspect of one or more embodiments of the present invention may be used in applications such as, for example, adhesive agents, coating materials, binders for reinforcement fibers, composite materials, molding materials for 3D printers, sealants, electronic substrates, ink binders, wood chip binders, binders for rubber chips, foam chip binders, binders for castings, rock mass consolidation materials for floor materials and ceramics, and urethane foams.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:

1. A resin composition comprising:
polymer particles (A); and
a matrix resin (B),
wherein
the polymer particles (A) have a graft part and an elastic body,
the graft part is a polymer that
(i) (i-a) contains no structural unit containing an aromatic group or
(i-b) contains, in 100% by weight of the graft part, more than 0% by weight but not more than 10% by weight of a structural unit containing an aromatic group,
(ii) contains at least one selected from the group consisting of a structural unit derived from alkyl methacrylate and a structural unit derived from alkyl acrylate, and
(iii) contains no structural unit containing an alkoxy group, no structural unit containing an aryloxy group, no structural unit containing an oxetane group, no structural unit containing a hydroxy group, no structural unit containing an amino group, no structural unit containing an imide group, no structural unit containing a carboxylic acid group, no structural unit containing a carboxylic anhydride group, no structural unit containing a cyclic ester group, no structural unit containing a cyclic amide group, no structural unit containing a benzoxazine group, and no structural unit containing a cyanate ester group, and
the graft part has a glass transition temperature of −25° C. to 18° C.
the elastic body contains at least one selected from the group consisting of diene-based rubbers and organosiloxane-based rubbers,
the diene-based rubbers contain a structural unit derived from a diene-based monomer in an amount of 50% by weight to 100% by weight, and
the matrix resin (B) comprises at least one type of thermosetting resin selected from the group consisting of epoxy resins, phenolic resins, polyol resins, and amino-formaldehyde resins,
wherein the epoxy resins comprise at least one selected from the group consisting of bisphenol A epoxy resin, bisphenol F epoxy resin, bisphenol AD epoxy resin, bisphenol S epoxy resin, glycidyl ester type epoxy resin, glycidyl amine type epoxy resin, novolac type epoxy resin, hydrogenated bisphenol A epoxy resin, hydrogenated bisphenol F epoxy resin, fluorinated epoxy resin, flame-resistant epoxy resin, p-oxybenzoic acid glycidyl ether ester type epoxy resin, m-aminophenol type epoxy resin, diaminodiphenylmethane-based epoxy resin, alicyclic epoxy resin, N,N-diglycidyl aniline, N,N-diglycidyl-o-toluidine, triglycidyl isocyanurate.

2. The resin composition according to claim 1, wherein the polymer particles (A) are contained in an amount of 20% by weight to 50% by weight and the matrix resin (B) is contained in an amount of 50% by weight to 80% by weight, where 100% by weight represents a total amount of the polymer particles (A) and the matrix resin (B).

3. A resin composition comprising:
polymer particles (A); and
a matrix resin (B),
wherein
the polymer particles (A) have a graft part and an elastic body,
the graft part is a polymer that, in 100% by weight of the graft part,
(i) (i-a) contains no structural unit containing an aromatic group or
(i-b) contains more than 0% by weight but not more than 10% by weight of a structural unit containing an aromatic group, and
(ii) (ii-a) contains at least one selected from the group consisting of a structural unit derived from alkyl methacrylate and a structural unit derived from alkyl acrylate, (ii-b) in a total amount of not less than 50% by weight,
the graft part has a glass transition temperature of −25° C. to 18° C.,
the polymer particles (A) are contained in an amount of 20% by weight to 50% by weight and the matrix resin (B) is contained in an amount of 50% by weight to 80% by weight, where 100% by weight represents a total amount of the polymer particles (A) and the matrix resin (B),
the elastic body contains at least one selected from the group consisting of diene-based rubbers and organosiloxane-based rubbers,
the diene-based rubbers contain a structural unit derived from a diene-based monomer in an amount of 50% by weight to 100% by weight, and
the matrix resin (B) comprises at least one type of thermosetting resin selected from the group consisting of epoxy resins, phenolic resins, polyol resins, and amino-formaldehyde resins,
wherein the epoxy resins comprise at least one selected from the group consisting of bisphenol A epoxy resin, bisphenol F epoxy resin, bisphenol AD epoxy resin, bisphenol S epoxy resin, glycidyl ester type epoxy resin, glycidyl amine type epoxy resin, novolac type epoxy resin, hydrogenated bisphenol A epoxy resin, hydrogenated bisphenol F epoxy resin, fluorinated epoxy resin, flame-resistant epoxy resin, p-oxybenzoic acid glycidyl ether ester type epoxy resin, m-aminophenol type epoxy resin, diaminodiphenylmethane-based epoxy resin, alicyclic epoxy resin, N,N-diglycidyl aniline, N,N-diglycidyl-o-toluidine, triglycidyl isocyanurate.

4. The resin composition according to claim 1, wherein the graft part contains no structural unit containing an aromatic group.

5. The resin composition according to claim 1, wherein the polymer particles (A) have a volume-average particle size of 0.15 μm to 0.30 μm.

6. The resin composition according to claim 1, wherein in 100% by weight of the graft part, the graft part contains more than 0% by weight but not more than 50% by weight of a structural unit having an epoxy group.

7. The resin composition according to claim 1, wherein in 100% by weight of the graft part, the graft part contains not less than 20% by weight of a structural unit derived from a monomer that provides a homopolymer having a glass transition temperature of not higher than 0° C.

8. The resin composition according to claim 1, wherein the resin composition has a viscosity of not more than 20,000 mPa's at 50° C.

9. The resin composition according to claim 1 wherein:

the polymer particles (A) are contained in an amount of 40% by weight to 50% by weight, where 100% by weight represents a total amount of the polymer particles (A) and the matrix resin (B); and the resin composition has a viscosity of not more than 20,000 mPas at 50° C.

10. The resin composition according to claim 1, further comprising an inorganic filler.

11. The resin composition according to claim 1, wherein the matrix resin (B) is an epoxy resin.

12. The resin composition according to claim 3, wherein the polymer particles (A) have a volume-average particle size of 0.15 μm to 0.30 μm.

13. The resin composition according to claim 3, wherein the resin composition has a viscosity of not more than 15,000 mPas at 50° C.

14. The resin composition according to claim 3, wherein the graft part has a glass transition temperature of −25° C. to −19° C.

15. The resin composition according to claim 3, wherein the graft part has a glass transition temperature of −11° C. to 18° C.

16. The resin composition according to claim 3, wherein the graft part has a glass transition temperature of −19° C. to 14° C.

17. The resin composition according to claim 3, wherein the graft part has a glass transition temperature of −13° C. to 14° C.

18. The resin composition according to claim 3, wherein the graft part comprises:

(a) the structural unit having an epoxy group and the structural unit derived from alkyl acrylate; or (b) the structural unit having an epoxy group, the structural unit derived from alkyl acrylate, and the structural unit containing the aromatic group, wherein a content of the structural unit containing the aromatic group is more than 0% by weight and not more than 10% by weight, in 100% by weight of the graft part.

19. The resin composition according to claim 3, wherein the resin composition further comprises an inorganic filler, and wherein the amount of the inorganic filler contained in 100% by weight of the resin composition is 0.1% by weight to 60.0% by weight, and the viscosity of the resin composition at 25° C. is not more than 280,000 mPa s.

20. The resin composition according to claim 3, wherein the graft part consists of:

(a) the structural unit having an epoxy group and the structural unit derived from alkyl acrylate; or (b) the structural unit having an epoxy group, the structural unit derived from alkyl acrylate, and the structural unit containing the aromatic group, wherein a content of the structural unit containing the aromatic group is more than 0% by weight and not more than 10% by weight, in 100% by weight of the graft part.

* * * * *